(12) United States Patent
Robert Jose et al.

(10) Patent No.: US 11,914,561 B2
(45) Date of Patent: Feb. 27, 2024

(54) SYSTEMS AND METHODS FOR INTERPRETING NATURAL LANGUAGE SEARCH QUERIES USING TRAINING DATA

(71) Applicant: Rovi Guides, Inc., San Jose, CA (US)

(72) Inventors: Jeffry Copps Robert Jose, Chennai (IN); Ajay Kumar Mishra, Bangalore (IN)

(73) Assignee: ROVI GUIDES, INC., San Jose, CA (US)

( * ) Notice: Subject to any disclaimer, the term of this patent is extended or adjusted under 35 U.S.C. 154(b) by 685 days.

(21) Appl. No.: 16/807,419

(22) Filed: Mar. 3, 2020

(65) Prior Publication Data

US 2021/0280175 A1   Sep. 9, 2021

(51) Int. Cl.
*G06F 16/22* (2019.01)
*G06F 16/242* (2019.01)
*G06F 16/2455* (2019.01)

(52) U.S. Cl.
CPC ........ *G06F 16/2228* (2019.01); *G06F 16/243* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 6,523,026 B1 * | 2/2003 | Gillis | G06F 16/3332 |
| 6,615,172 B1 | 9/2003 | Bennett et al. | |
| 6,901,399 B1 | 5/2005 | Corston et al. | |
| 7,536,408 B2 | 5/2009 | Patterson | |
| 10,515,125 B1 | 12/2019 | Lavergne | |
| 10,769,371 B1 | 9/2020 | Barrientos et al. | |
| 10,860,631 B1 * | 12/2020 | Huang | G06F 16/3334 |
| 11,594,213 B2 | 2/2023 | Robert Jose et al. | |
| 2003/0078766 A1 | 4/2003 | Appelt et al. | |
| 2004/0024739 A1 * | 2/2004 | Copperman | G06F 16/367 |
| | | | 707/E17.084 |
| 2008/0208566 A1 | 8/2008 | Alonichau | |
| 2009/0070300 A1 | 3/2009 | Bartels et al. | |
| 2009/0150152 A1 | 6/2009 | Wasserblat et al. | |
| 2009/0171945 A1 * | 7/2009 | Li | G06F 16/93 |
| | | | 707/999.005 |
| 2009/0287678 A1 | 11/2009 | Brown et al. | |
| 2010/0185661 A1 * | 7/2010 | Malden | G06Q 10/06 |
| | | | 707/769 |

(Continued)

OTHER PUBLICATIONS

International Search Report and Written Opinion of PCT/US2020/065307 dated Feb. 18, 2021 (13 pages).

*Primary Examiner* — Christopher J Raab
(74) *Attorney, Agent, or Firm* — HALEY GUILIANO LLP

(57) ABSTRACT

A frequency of occurrence for each term in a training data set is determined in relation to the entire training data set. A relational data structure is generated that associates each term in the training data with its respective frequency. Any term that has a frequency below a threshold frequency is then added to a list of relevant words. When a natural language search query is received, a plurality of terms in the natural language search query are identified and compared with the list of relevant words. If any term of the natural language search query is included in the relevant words list, that term is identified as a keyword. The natural language search query is then interpreted based on any identified keywords.

12 Claims, 16 Drawing Sheets

(56) References Cited

U.S. PATENT DOCUMENTS

| | | | |
|---|---|---|---|
| 2010/0306144 A1* | 12/2010 | Scholz | G06N 20/00 707/E17.014 |
| 2011/0161341 A1 | 6/2011 | Johnston | |
| 2011/0213761 A1* | 9/2011 | Song | G06F 16/9535 707/723 |
| 2012/0035932 A1 | 2/2012 | Jitkoff et al. | |
| 2012/0084312 A1 | 4/2012 | Jenson | |
| 2012/0136649 A1 | 5/2012 | Freising et al. | |
| 2013/0021346 A1 | 1/2013 | Terman | |
| 2013/0262361 A1 | 10/2013 | Arroyo et al. | |
| 2014/0280081 A1 | 9/2014 | Tropin et al. | |
| 2015/0026176 A1 | 1/2015 | Bullock | |
| 2015/0120723 A1 | 4/2015 | Deshmukh et al. | |
| 2015/0269176 A1 | 9/2015 | Marantz et al. | |
| 2015/0287096 A1 | 10/2015 | Jacobsson | |
| 2016/0034600 A1 | 2/2016 | Joshi | |
| 2016/0147872 A1* | 5/2016 | Agarwalla | G06F 16/3338 707/713 |
| 2016/0147893 A1 | 5/2016 | Mashiach et al. | |
| 2016/0180438 A1 | 6/2016 | Boston et al. | |
| 2016/0275178 A1* | 9/2016 | Liu | G06F 16/319 |
| 2017/0017724 A1* | 1/2017 | MacGillivray | G06F 16/9535 |
| 2017/0075985 A1 | 3/2017 | Chakraborty et al. | |
| 2017/0097967 A1 | 4/2017 | Savliwala et al. | |
| 2017/0116260 A1 | 4/2017 | Chattopadhyay | |
| 2017/0199928 A1 | 7/2017 | Zhao et al. | |
| 2017/0228372 A1 | 8/2017 | Moreno et al. | |
| 2017/0278514 A1 | 9/2017 | Mathias et al. | |
| 2017/0344622 A1* | 11/2017 | Islam | G06F 16/2455 |
| 2019/0005953 A1 | 1/2019 | Bundalo et al. | |
| 2019/0102482 A1 | 4/2019 | Ni | |
| 2019/0163781 A1 | 5/2019 | Ackermann et al. | |
| 2020/0210891 A1* | 7/2020 | Safronov | G06N 20/00 |
| 2021/0019309 A1 | 1/2021 | Yadav et al. | |
| 2021/0026906 A1 | 1/2021 | Reznik | |
| 2021/0056114 A1* | 2/2021 | Price | G06F 16/24578 |
| 2021/0173836 A1 | 6/2021 | Robert Jose et al. | |
| 2021/0232613 A1 | 7/2021 | Raval Contractor et al. | |
| 2021/0279264 A1 | 9/2021 | Robert Jose et al. | |
| 2021/0280174 A1 | 9/2021 | Robert Jose et al. | |
| 2021/0280176 A1 | 9/2021 | Robert Jose et al. | |
| 2022/0100741 A1 | 3/2022 | Robert Jose et al. | |
| 2023/0169960 A1 | 6/2023 | Robert Jose et al. | |

* cited by examiner

SYSTEMS AND METHODS FOR INTERPRETING NATURAL LANGUAGE SEARCH QUERIES USING TRAINING DATA

BACKGROUND

This disclosure relates to processing search queries and, more particularly, interpreting natural language search queries.

SUMMARY

With the proliferation of voice controlled smart devices, users are more frequently entering search queries using natural language. Natural language search queries are normally processed by simply applying a filter, such as content type, to the query, and returning any results that match the query within that filter. However, many natural language search queries include words that are contextually relevant to the search query but are ignored by the processing systems because they are not associated with any keyword or genre by themselves. Thus, the results of the search do not provide content for which the user was searching.

Systems and methods are described herein for interpreting natural language search queries that account for contextual relevance of words of the search query that would ordinarily not be processed, including, for example, processing each word of the query. A natural language search query is received, either as a voice input, a text input, or a transcribed voice-to-text input, and a plurality of terms in the natural language search query are identified. Each term is associated with a respective part of speech, and a frequency of occurrence of each term in content metadata is determined. A relevance of each term is then determined based on its respective part of speech and frequency. The natural language search query is then interpreted based on the importance or relevance of each term. Search results are retrieved based on the interpreted search query, and the results are then generated for display.

For example, a search query for "poison movies" may be received, and the user may intend to search for movies in which a character is poisoned, or in which poison is a major plot point. While the word "movies" may normally be identified as a keyword indicating the desired type of content, the word "poison" is not associated with any genre, actor, or other identifying information that could narrow a search for movies to those that are about poison or have poison as a major plot point or plot device. However, the system processes the word "poison" to identify that it is a noun and determines its frequency of occurrence to be low. Based on this data, the word "poison" is marked as a keyword and the search query is interpreted as a query for movies whose metadata contain the word "poison," such as in a plot summary. Other examples may include searches for "movies that will make me cry" or "videos where a boy falls from his bike." These searches identify the primary type of content ("movies" or "videos") but the remaining words do not match up with any preexisting content identifiers that would allow for a meaningful search. Identifying terms such as "make me cry" as uncommon search terms results in a determination that the term is relevant to the search query.

The natural language interpreter may also be trained using a training data set compiled from previous natural language searches that have been annotated. A frequency of occurrence for each term in the training data set is determined in relation to the entire training data set. A relational data structure is generated that associates each term in the training data with its respective frequency. Any term that has a frequency below a threshold frequency is then added to a list of relevant words. When a natural language search query is received, a plurality of terms in the natural language search query are identified and compared with the list of relevant words. If any term of the natural language search query is included in the relevant words list, that term is identified as a keyword. The natural language search query is then interpreted based on any identified keywords. As above, search results are retrieved based on the interpreted search query and generated for display to the user.

For example, the training data may include a total of ten thousand words, and the threshold frequency may be one percent. Thus, if a word appears in the training data less than one hundred times, then that words is added to the relevant words list. Using the above example, the relevance of the word "poison" can be determined by checking if the word "poison" appears on the relevant words list. If the word "poison" appears on the relevant words list, then it is identified as a keyword, and the natural language search query is interpreted as a query for movies whose metadata contain the word "poison," such as in a plot summary.

In some cases, a query type can be determined based on the structure of the natural language search query. The natural language search query is processed to determine whether it is a complete sentence. If so, a number of terms are identified in the natural language search query and each term is associated with a part of speech. Based on the sentence structure, a type of query is determined, and the natural language search query is interpreted in the context of the query type based on the parts of speech of each term in the natural language search query. For example, the sentence "Show me movies of Tom Cruise where he is flying" may be received as a natural language search query. Using natural language processing, the search query is identified as a complete sentence, and a sequence labeling algorithm such as Hidden Markov Model or Conditional Random Field identifies each part of the sentence. Each part of the sentence is labelled with a part of speech, and the term "show me movies" is used to identify that the natural language search query is a query for multimedia content, specifically movies. "Tom Cruise" is identified as a proper noun, and "where" is identified as a filter trigger word. "He" is identified as a pronoun referring to Tom Cruise as the previously identified proper noun subject of the sentence. "Is" is a stop word, which indicates that the words which follow it are the parameters of the previously triggered filter. Finally, "flying" is identified as a verb and the parameter for the filter to be applied to the search for movies starring Tom Cruise. Thus, the natural language search query is interpreted to be a search for movies starring the actor Tom Cruise and containing scenes in which he is flying. Search results are retrieved based on the interpretation, and the results are generated for display to the user.

The natural language search query can also be interpreted through use of machine learning, such as using one or more neural networks. After identifying a number of terms in the natural language search query, a vector is generated for each term describing a relationship between each term and a plurality of other terms. Each vector is then input into a trained neural network that generates an output based on the input vectors. The natural language search query is then interpreted based on the output of the neural network. For example, for the query "Movies of Tom Cruise where he is flying," a vector for "Tom Cruise" may be generated that represents degrees of connection between Tom Cruise and other terms, such as co-stars, movie titles, or other terms. A vector for "flying" may be generated that represents degrees of connection between "flying" and other terms, such as "airplane," "helicopter," "jet," and "falling." These vectors may be input into a neural network which processes each input vector and outputs an interpretation of the search query. For example, the vector for Tom Cruise may indicate a connection with Val Kilmer, and both Tom Cruise and Val Kilmer have a connection to "flying." The neural network may then output an interpretation of the search query that focuses on the movie "Top Gun" starring Tom Cruise and Val Kilmer. Other examples may include searches for "movies that will make me cry" or "videos where a boy falls from his bike." These searches identify the primary type of content ("movies" or "videos") but the remaining words do not match up with any preexisting content identifiers that would allow for a meaningful search. Identifying terms such as "make me cry" as uncommon search terms results in a determination that the term is relevant to the search query, and a vector connecting this term to a particular genre of movie would result in an interpretation that accounts for the relevance of the term. Search results are then retrieved based on the interpreted search query and generated for display to the user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
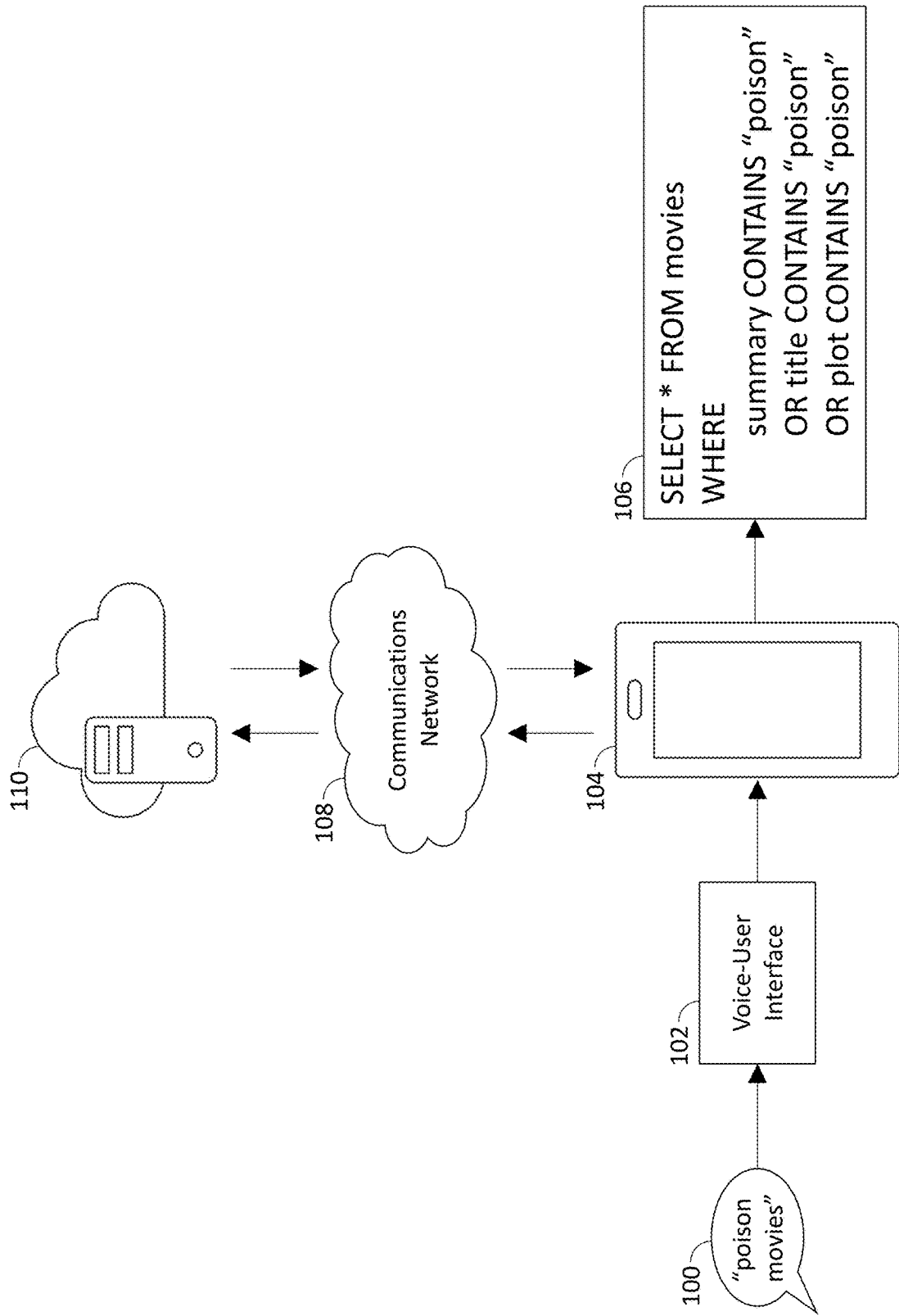
FIG. 1 shows a first system for interpreting a natural language search query, in accordance with some embodiments of the disclosure.

FIG. 1 shows a first system for interpreting a natural language search query, in accordance with some embodiments of the disclosure. Natural language search query 100 may be received from a user or from an input device. Voice-user interface 102 may capture spoken words representing the natural language search uttered by the user and transmit a digital representation of the spoken natural language search query to a user device 104. User device 104 processes the words of the natural language search query and generates interpretation 106 of the natural language search query. User device 104 may transmit the interpreted query, via a communications network 108, to a server 110, which provides search results back to user device 104. User device 104 may also request or retrieve metadata describing content items from server 110 and use it to determine the relevance of each word or term of the natural language search query. Interpretation 106 of the natural language search query may be based on the relevance of each word or term. For example, natural language search query 100 may be the words "poison movies." User device 104 determines, based on the metadata, that the word "poison" is an infrequent word, and must therefore be relevant to the query. User device 104 also determines that the word "movies" is a type of content for which a search should be performed. Based on this information, user device 104 interprets the natural language search query and generates a corresponding query in a format that can be understood by server 110, such as an SQL "SELECT" command. The command shown in interpretation 106 is an SQL command to select all records from a "movies" table of a content database where any of a summary, a title, or a plot synopsis contains the word "poison."

Figure 2:
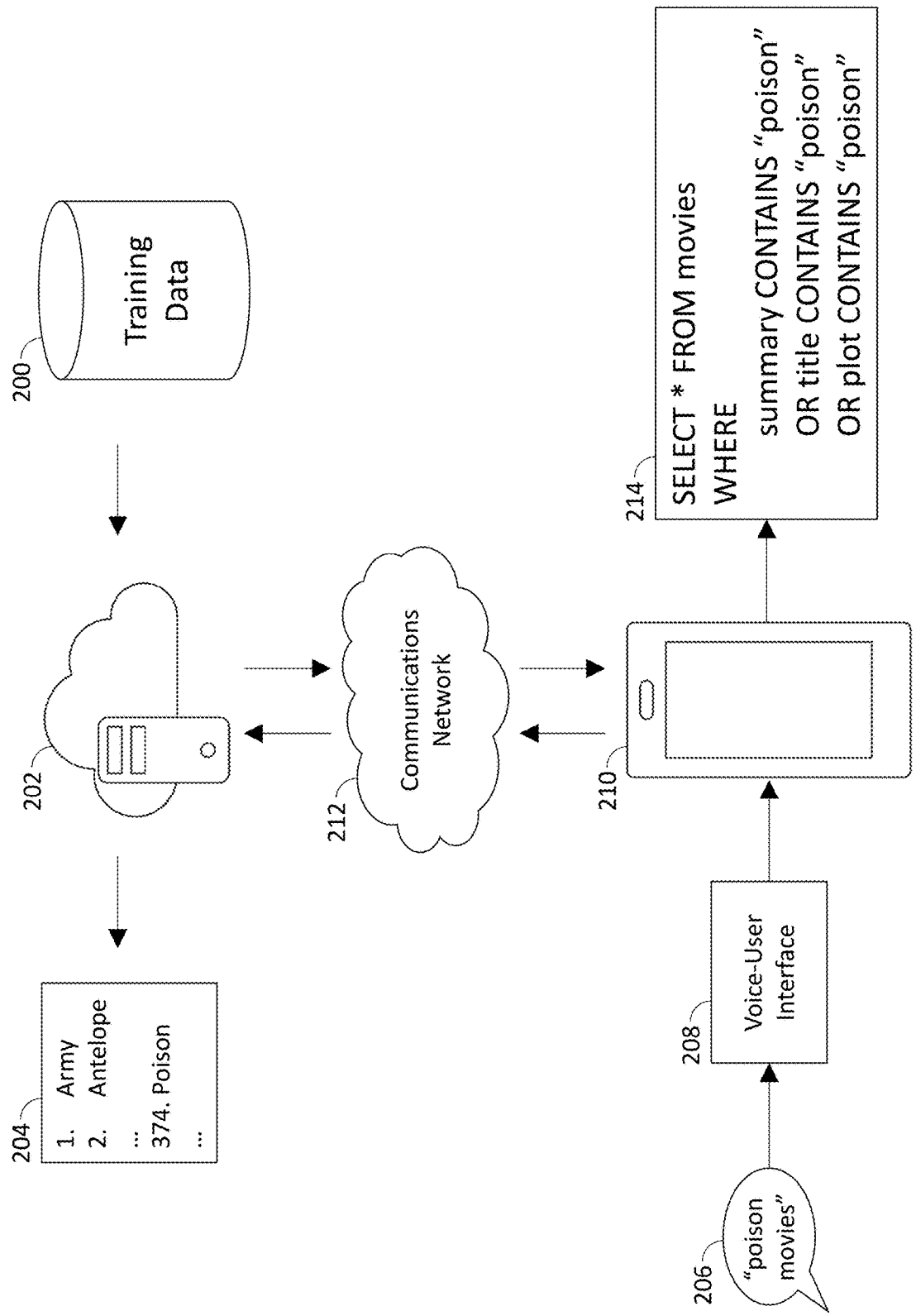
FIG. 2 shows a second system for interpreting a natural language search query, in accordance with some embodiments of the disclosure.

FIG. 2 shows a second system for interpreting a natural language search query, in accordance with some embodiments of the disclosure. In some embodiments, a training data set 200 may be provided to, or accessed by, server 202. Server 202 may use the training data set to determine a list of relevant words 204. A natural language search query 206 is received, via voice-user interface 208, at user device 210. User device 210 may request or retrieve, via communications network 212, relevant words list 204 from server 202. User device 210 may compare each word or term of natural language search query 206 to relevant words list 204 to determine relevant words or terms of natural language search query 206. The relevant words of natural language search query 206 are identified as keywords, and user device 210 interprets natural language search query 206 based on the identified keywords. For example, natural language search query 206 may be the word "poison movies." Based on the training data 200, server 202 determines that "poison" is an infrequent word and adds it to the relevant words list 204. User device 210 compares the word "poison" to the relevant words list 204 received from server 202 and finds that the word "poison" is included therein. Based on this, user device 210 identifies "poison" as a keyword. As above, user device 210 identifies the word "movies" as a type of content for which a query should be performed, and generates interpretation 214, which may be a SQL command as described above.

Figure 3:
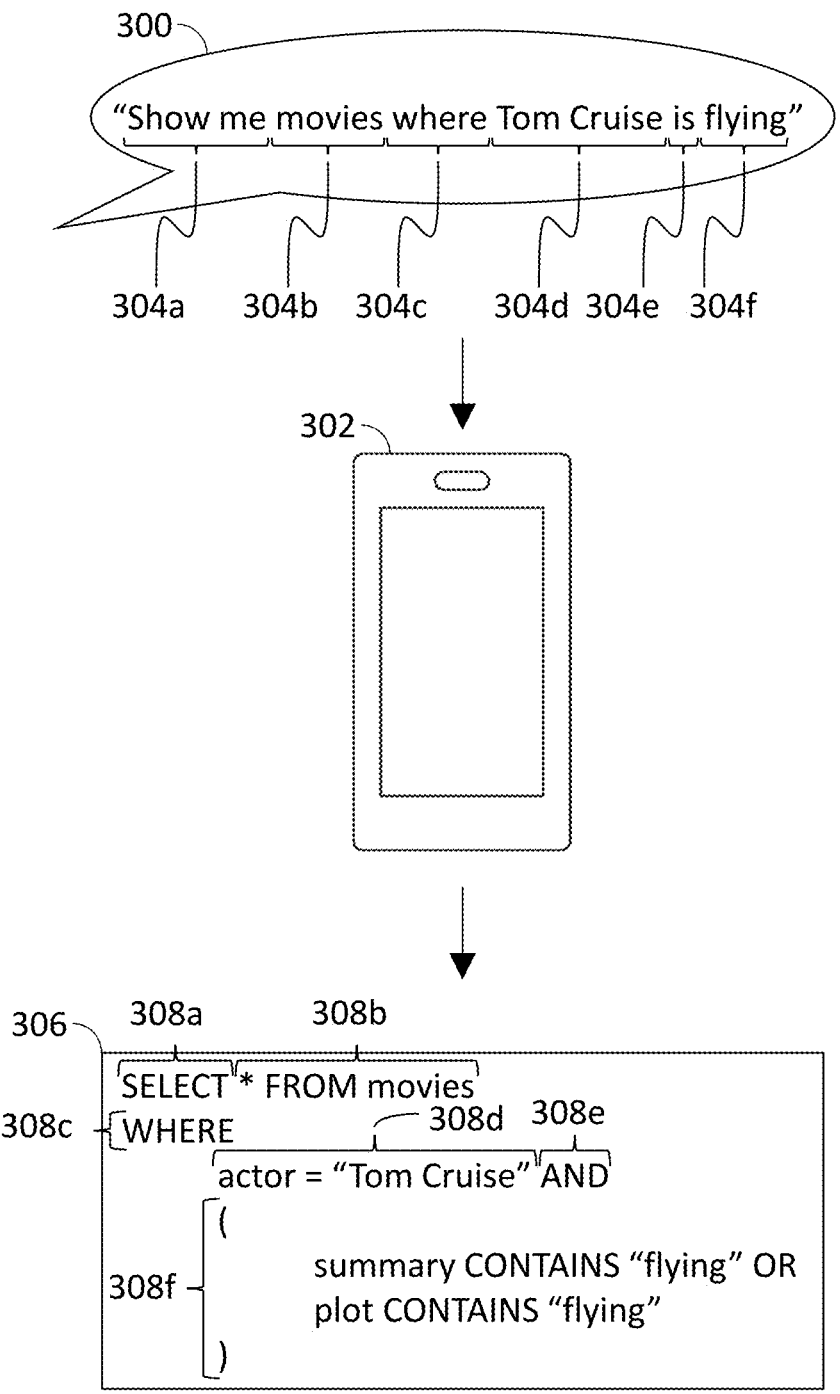
FIG. 3 shows a third system for interpreting a natural language search query, in accordance with some embodiments of the disclosure.

FIG. 3 shows a third system for interpreting a natural language search query, in accordance with some embodiments of the disclosure. Natural language search query 300 is received by user device 302. For example, natural language search query 300 may be the sentence "Show me movies where Tom Cruise is flying." The user device splits natural language search query 300 into a plurality of terms 304a-304f using natural language processing. User device 302 associates each term with a part of speech. Term 304a ("show me") is identified as a query trigger; term 304b ("movies") is identified as a query type; term 304c ("where") is identified as a filter trigger, indicating that at least one term which follows the filter trigger should be applied as a filter to the query; term 304d ("Tom Cruise") is identified as a proper noun and/or a person's name; term 304e ("is") is identified as a stop word, which is determined based on context to be an additional filter trigger for an additional filter parameter; and term 304f ("flying") is identified as a verb and as the second filter parameter. Based on these associations, user device 302 generates interpretation 306, such as an SQL command, in which each of terms 304a-304f are included as corresponding portions 308a-308f of the SQL command. Portion 308a, which initializes a search query, corresponds to term 304a; portion 308b, which identifies what records to select and from which table the records should be selected, corresponds to term 304b; portion 308c, which initializes a search filter, corresponds to term 304c; portion 308d, which represents a first filter parameter, corresponds to term 304d; portion 308e, which indicates an additional filter parameter, corresponds to term 304e; and portion 308f, which represents the second filter parameter, corresponds to term 304f.

Figure 4:
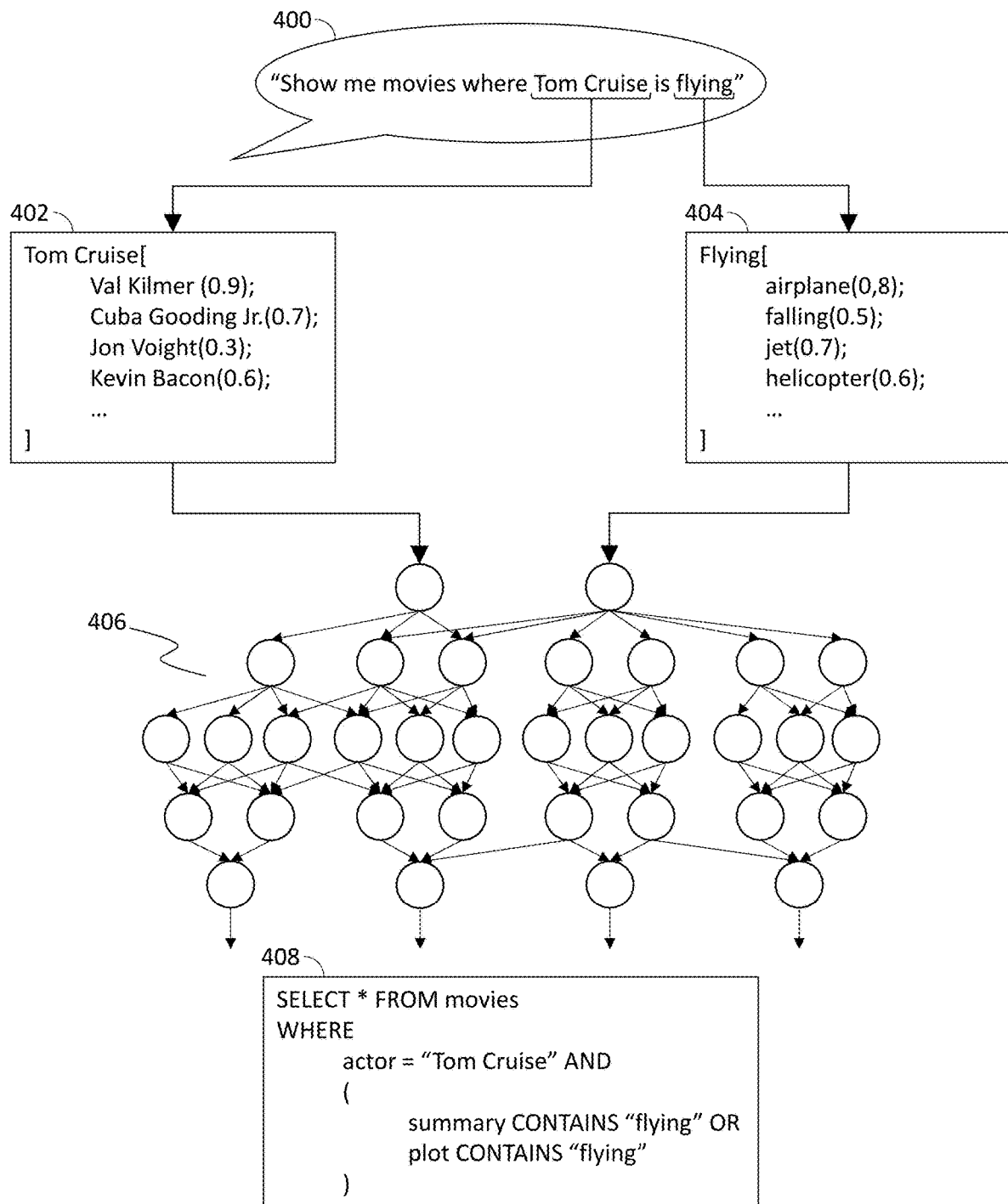
FIG. 4 shows a fourth system for interpreting a natural language search query in accordance with some embodiments of the disclosure.

FIG. 4 shows a fourth system for interpreting a natural language search query in accordance with some embodiments of the disclosure. Natural language search query 400 is received by a user device (not shown). The user device generates vectors for terms of the natural language search query. For example, the natural language search query may be the sentence "Show me movies where Tom Cruise is flying." The user device may identify "Tom Cruise" and "flying" as relevant word of the natural language search query. The user device then generates a vector 402, describing connections between "Tom Cruise" and other terms and the distance between "Tom Cruise" and each of the other terms, and vector 404, describing connections between "flying" and other terms and the distance between "flying" and each of the other terms. Vectors 402 and 404 are then inputted into trained neural network 406 which processes the terms "Tom Cruise" and "flying" based on the input vectors and outputs an interpretation of each term, which is used to generate interpretation 408.

Figure 5:
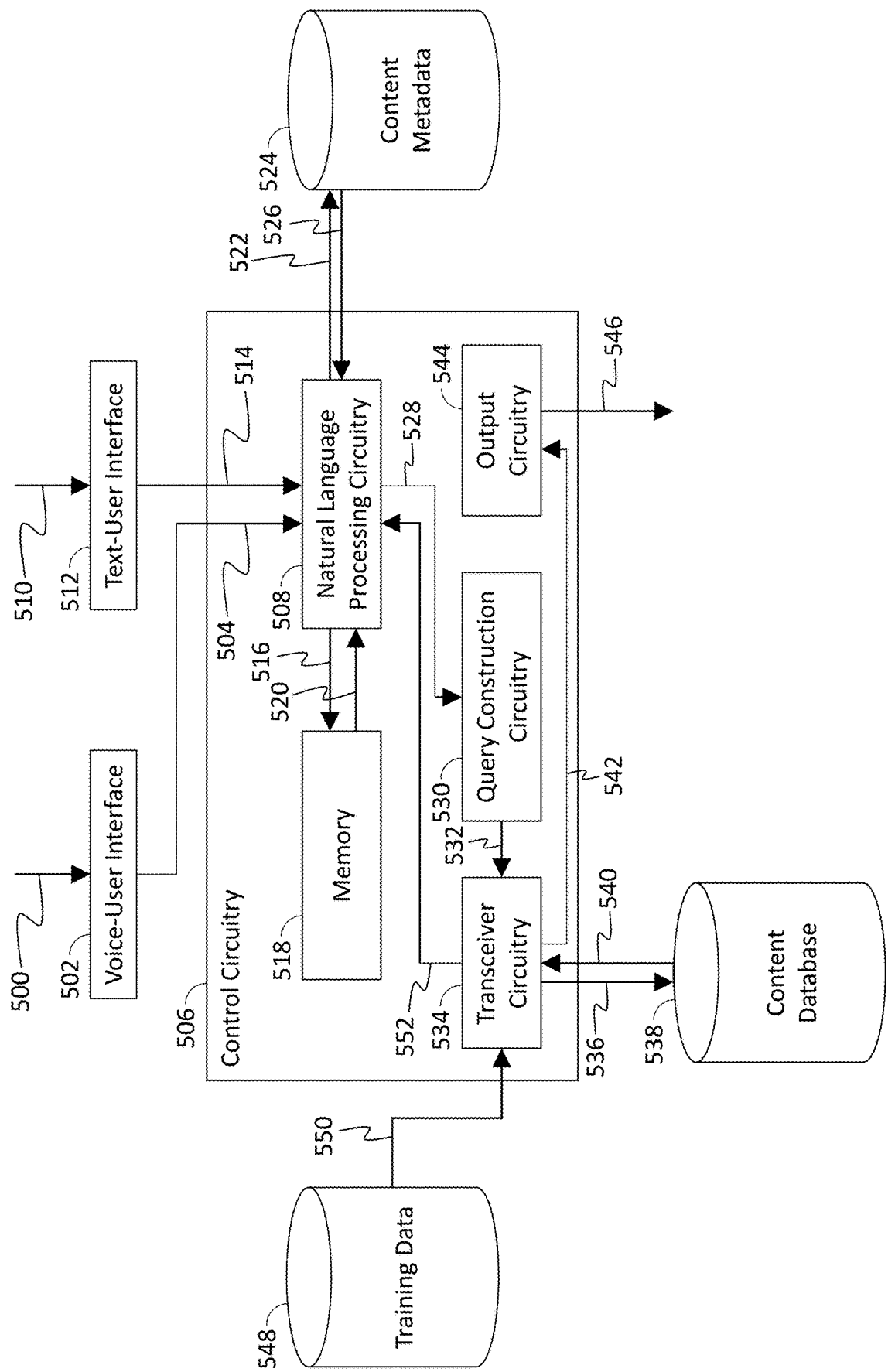
FIG. 5 is a block diagram show components and data flow therebetween of a device for interpreting a natural language search query, in accordance with some embodiments of the disclosure.

FIG. 5 is a block diagram show components and data flow therebetween of a device for interpreting a natural language search query, in accordance with some embodiments of the disclosure. A natural language search query may be received as voice input 500 using voice-user interface 502. Voice-user interface 502 may include a microphone or other audio capture device capable of capturing raw audio data and may convert raw audio data into a digital representation of voice input 500. Voice-user interface 502 may also include a data interface, such as a network connection using ethernet or Wi-Fi, a Bluetooth connection, or any other suitable data interface for receiving digital audio from another input device. Voice-user interface 502 transmits 504 the digital representation of the voice input to control circuitry 506, where it is received using natural language processing circuitry 508. Natural language processing circuitry may transcribe the audio representing the natural language search query to generate a corresponding text string or may process the audio data directly. Alternatively, a natural language search query may be received as text input 510 using text-user interface 512, which may include similar data interfaces to those described above in connection with voice-user interface 502. Text-user interface 512 transmits 514 the text input 510 to control circuitry 506, where it is received using natural language processing circuitry 508.

Control circuitry 506 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Natural language processing circuitry 508 identifies a plurality of terms in the natural language search query. For example, natural language processing circuitry 508 may identify individual words in the natural language search query using spaces in text input 510 or pauses or periods of silence in voice input 500. Natural language processing circuitry 508 analyzes a first word and determines whether the first word can be part of a larger phrase. For example, natural language processing circuitry 508 may request 516 a dictionary or other word list or phrase list from memory 518. Memory 518 may be any device for temporarily storing electronic data, such as random-access memory, hard drives, solid state devices, quantum storage devices, or any other suitable fixed or removable storage devices, and/or any combination of the same.

Upon receiving 520 the dictionary or word list or phrase list from memory 520, natural language processing circuitry 508 determines if the first word can be followed by at least a second word. If so, natural language processing circuitry 508 analyzes the first word together the word immediately following the first word to determine if the two words together form a phrase. If so, the phrase is identified as a single term in the natural language search query. Otherwise, the first word alone is identified as a single term in the natural language search query.

Once the terms of the natural language search query have been identifier, natural language processing circuitry 508 associates each term with a part of speech. Natural language processing circuitry 508 also determines a frequency with which each term occurs. For example, natural language processing circuitry 508 may request 522 metadata describing a plurality of content items from content metadata 524. Natural language processing circuitry 508 receives 526 the requested metadata and determines how many occurrences of each term there are in the metadata as a percentage of the total number of terms in the metadata. Using the part of speech and frequency of each term, natural language processing circuitry 508 determines a relevance for each term and interprets the natural language search query based on the relevance of each term.

Natural language processing circuitry 508 transmits 528 the interpretation of the natural language search query to query construction circuitry 530 which constructs a search query corresponding to the natural language search query in a format that can be understood by, for example, a content database. Query construction circuitry 530 transmits 532 the constructed search query to transceiver circuitry 534, which transmits 536 the search query to, for example, content database 538. Transceiver circuitry 534 may be a network connection such as an Ethernet port, WiFi module, or any other data connection suitable for communicating with a remote server. Transceiver circuitry 534 then receives 540 search results from content database 538 and transmits 542 the search results to output circuitry 544. Output circuitry 544 then generates for display 546 the search results. Output circuitry 544 may be any suitable display driver or other graphic or video signal processing circuitry.

In some embodiments, a training data set is used to determine the relevance of each term. Training data 548 may be processing by control circuitry 506 or by a remote server to determine the relevance of a plurality of terms included in the training data. The resulting list of relevant terms is transmitted 550 to control circuitry 506, where it is received using transceiver circuitry 534. Transceiver circuitry 534 transmits 552 the received list of relevant terms to natural language processing circuitry 508 for use in determining the relevance of each term in the natural language search query.

Figure 6:
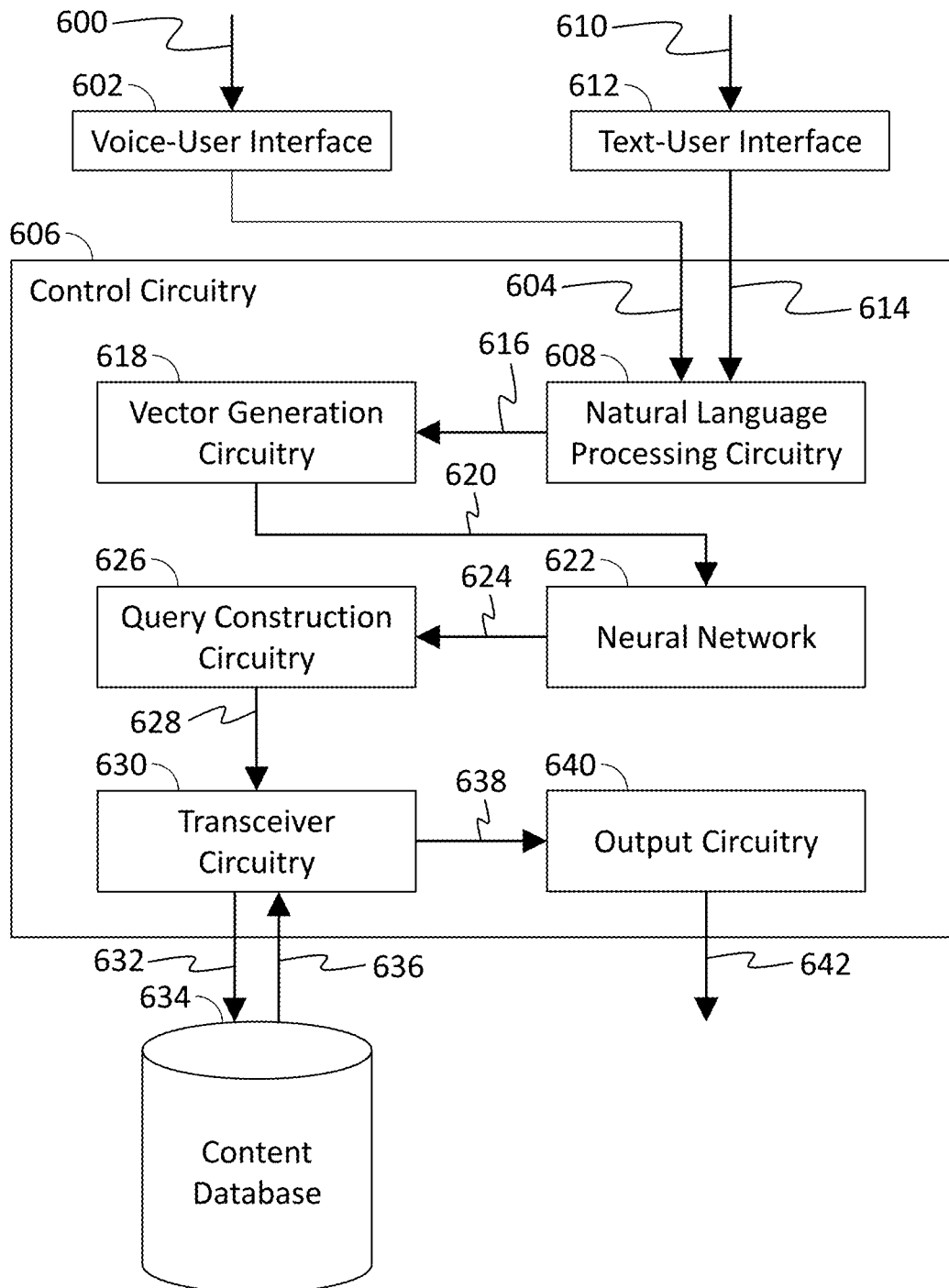
FIG. 6 is a block diagram showing components and data flow therebetween of a device for enabling interpretation of a natural language search query, in accordance with some embodiments of the disclosure.

FIG. 6 is a block diagram showing components and data flow therebetween of a device for enabling interpretation of a natural language search query, in accordance with some embodiments of the disclosure. As described above in connection with FIG. 5, a natural language search query may be received as a voice input 600 using voice-user interface 602, which transmits 604 a digital representation of voice input 600 to control circuitry 606, where it is received by natural language processing circuitry 608, or as a text input 610 using text-user interface 612, which transmits 614 the natural language search query to control circuitry 606 where it is received by natural language processing circuitry 608.

Control circuitry 606 may, like control circuitry 506, be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Natural language processing circuitry 608, after processing the natural language search query to identify a plurality of term therein and their relevance to the query, transmits 616 the relevant terms to vector generation circuitry 618. Vector generation circuitry 618 may access a knowledge graph or other data source to identify connections between each of the relevant terms and other terms, as well as the distance between each relevant term and the terms to which it is connected. Vector generation circuitry 618 transmits 620 the vectors for each relevant term to neural network 622 which may be trained used Hidden Markov Model or Conditional Random Field algorithms to process and interpret the relevant terms of the search query. Neural network 622 outputs interpretations of each relevant term and transmits 624 the interpretations to query construction circuitry 626. Query construction circuitry 626, using the interpretations received from neural network 622, generates a corresponding search query in a format that can be understood by, for example, a content database. Query construction circuitry 626 transmits 628 the constructed query to transceiver circuitry 630, which in turn transmits 632 the constructed query to, for example, content database 634. Like transceiver circuitry 534, transceiver circuitry 632 may be a network connection such as an Ethernet port, WiFi module, or any other data connection suitable for communicating with a remote server. Transceiver circuitry 630 then receives 636 search results from content database 634 and transmits 638 the search results to output circuitry 640. Output circuitry 640 then generates for display 642 the search results. Output circuitry 640, like output circuitry 544, may be any suitable display driver or other graphic or video signal processing circuitry.

Figure 7:
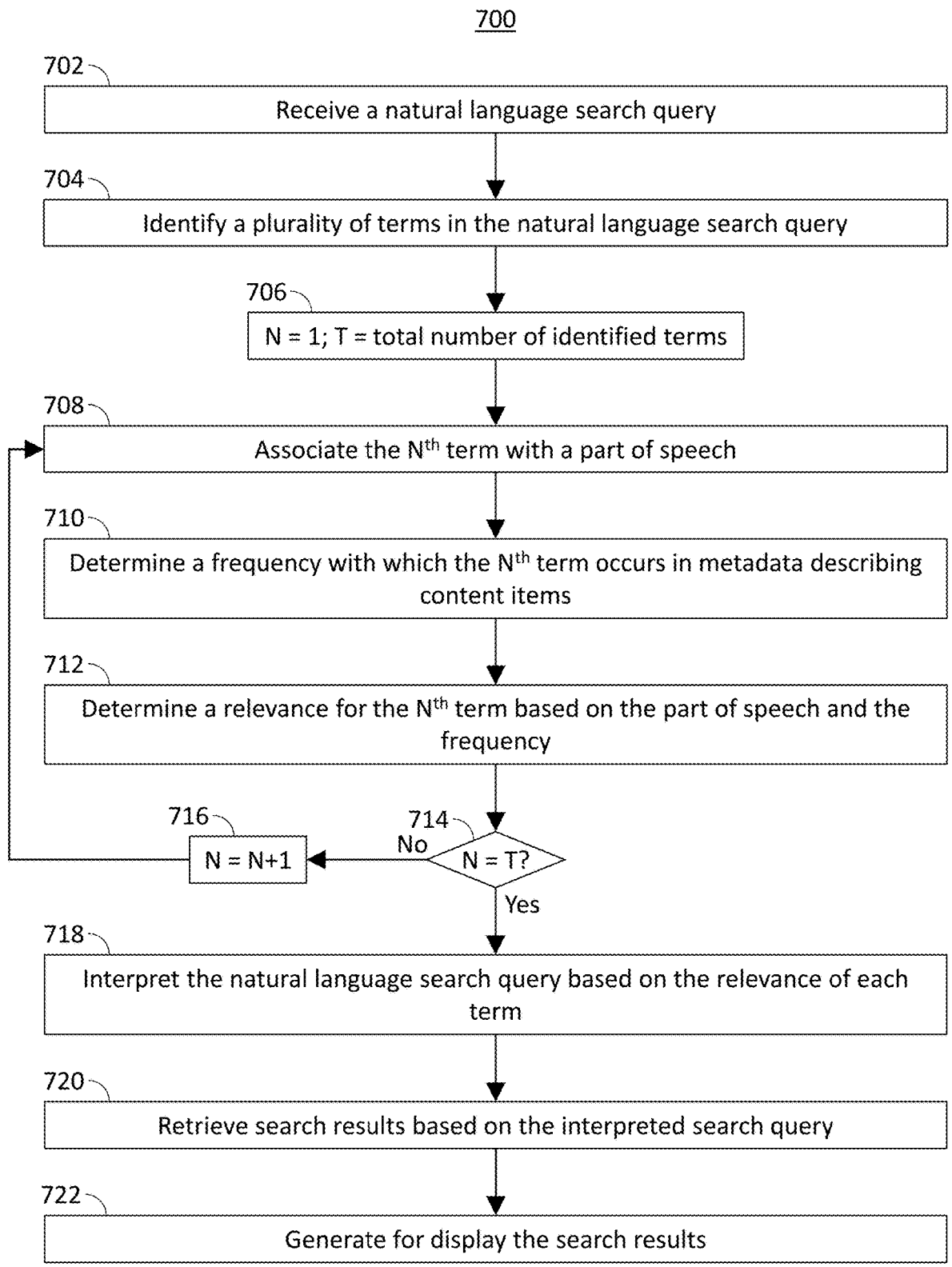
FIG. 7 is a flowchart representing a first process for interpreting a natural language search query, in accordance with some embodiments of the disclosure.

FIG. 7 is a flowchart representing a first illustrative process 700 for interpreting a natural language search query, in accordance with some embodiments of the disclosure. Process 700 may be implemented on control circuitry 506 or control circuitry 606. In addition, one or more actions of FIG. 7 may be incorporated into or combined with one or more actions of any other process or embodiment described herein.

At 702, control circuitry (e.g., control circuitry 506) receives a natural language search query. At 704, control circuitry 506, using natural language processing circuitry 508, identifies a plurality of terms in the natural language search query. This may be accomplished using methods described below in connection with FIG. 8.

At 706, control circuitry 506 initializes a counter variable N, setting its value to one, and a variable T representing the total number of identified terms. At 708, control circuitry 506, using natural language circuitry 508, associates the $N^{th}$ term of the natural language search query with a part of speech. For example, natural language processing circuitry 508 may access a dictionary or other word list or phrase list to identify a part of speech to which the $N^{th}$ term corresponds. At 710, control circuitry 506, using natural language circuitry 508, determines a frequency with which the $N^{th}$ term occurs in metadata describing content items. This may be accomplished using methods described below in connection with FIG. 9. At 712, natural language processing circuitry 508 determines a relevance for the $N^{th}$ term based on the part of speech and the frequency of the $N^{th}$ term. This may be accomplished using methods described below in connection with FIG. 10.

At 714, control circuitry 506 determines whether N is equal to T, meaning that all terms of the natural language search query have been processed to determine their respective relevance. If N is not equal to T ("No" at 714), then, at 716, control circuitry 506 increments the value of N by one, and processing returns to step 708. If N is equal to T ("Yes" at 714), then, at 718, control circuitry 506 interprets the natural language search query based on the relevance of each term. This may be accomplished using methods described below in connection with FIG. 11.

At 720, control circuitry 506 retrieves search results (e.g., from content database 540) based on the interpreted search query. At 722, control circuitry 506, using output circuitry 544, generates the search results for display to the user.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
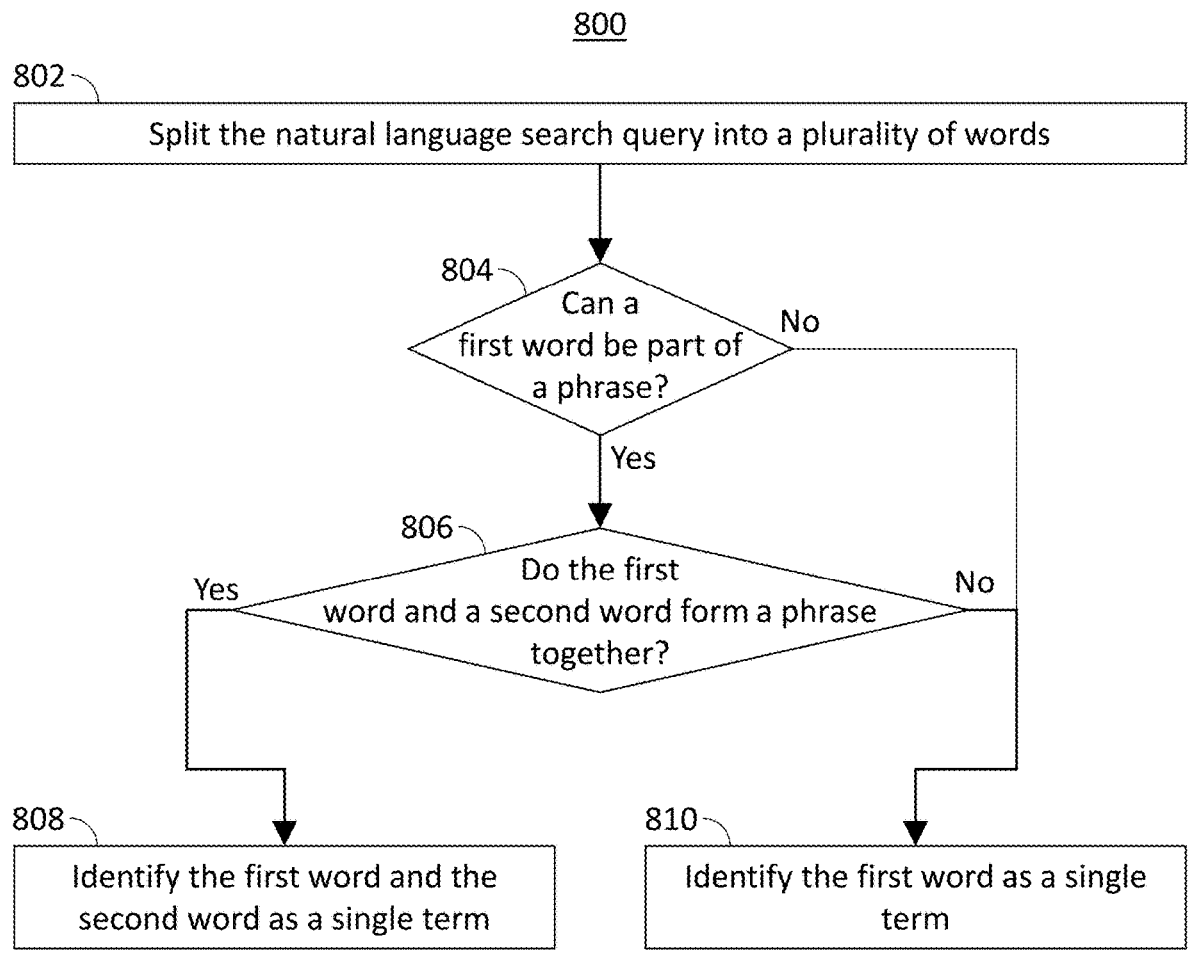
FIG. 8 is a flowchart representing a process for identifying a plurality of terms in a natural language search query, in accordance with some embodiments of the disclosure.

FIG. 8 is a flowchart representing an illustrative process 800 for identifying a plurality of terms in a natural language search query, in accordance with some embodiments of the disclosure. Process 800 may be implemented on control circuitry 506 or control circuitry 606. In addition, one or more actions of FIG. 8 may be incorporated into or combined with one or more actions of any other process or embodiment described herein.

At 802, control circuitry (e.g., control circuitry 506), using natural language processing circuitry 508, splits the natural language search query into a plurality of words. For example, natural language processing circuitry 508 may identify pauses or periods of silence in audio data representing the natural language search query and split the audio data at each period of silence to separate the audio data into audio chunks, each representing a single word. Alternatively, natural language processing circuitry 508 may receive the natural language search query as text or may transcribe audio data into corresponding text. Natural language processing circuitry 508 may then split the text into individual words at every space.

At 804, control circuitry 506, using natural language processing circuitry 508, determines whether a first word of the natural language search query can be part of a phrase. For example, natural language processing circuitry 508 may access a dictionary, word list, or phrase list, and identify any phrases that begin with the first word. If a phrase beginning with the first word is located ("Yes" at 804), then, at 806, natural language processing circuitry 508 determines whether the first word and a second word immediately following the first word form a phrase together. Natural language processing circuitry 508 may concatenate the first and second words to form a string representing a possible phrase formed by the first and second words together and compare the string to the dictionary, word list, or phrase list, as above. If the first and second words form a phrase together ("Yes" at 806), then, at 808, natural language processing circuitry 508 identifies the first and second word together as a single term. If the first and second words do not form a phrase together ("No" at 806) or if the first word cannot be part of a phrase at all ("No" at 804), then, at 810, natural language processing circuitry 508 identifies the first word as a single term.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
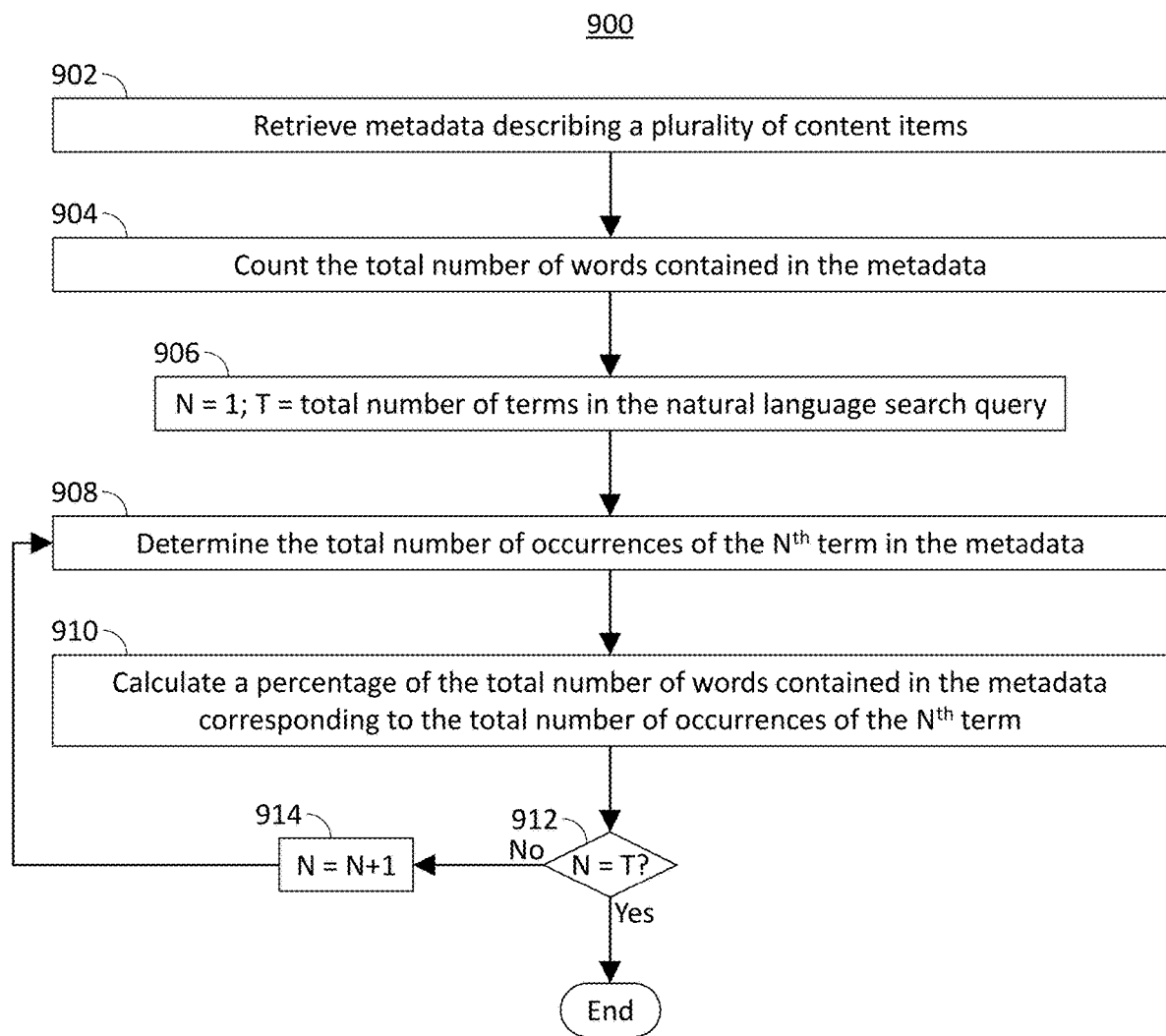
FIG. 9 is a flowchart representing a process for determining a frequency with which terms in a natural language search query occur in metadata, in accordance with some embodiments of the disclosure.

FIG. 9 is a flowchart representing an illustrative process 900 for determining a frequency with which terms in a natural language search query occur in metadata, in accordance with some embodiments of the disclosure. Process 900 may be implemented on control circuitry 506 or control circuitry 606. In addition, one or more actions of FIG. 9 may be incorporated into or combined with one or more actions of any other process or embodiment described herein.

At 902, control circuitry (e.g., control circuitry 506) retrieves metadata describing a plurality of content items. The metadata may be stored locally in memory 518 or may be stored at a remote server and retrieved using transceiver circuitry 534. At 904, control circuitry 506, using natural language processing circuitry 508, counts the number of words contained in the metadata. At 906, control circuitry 506 initializes a counter variable N, setting its value to one, and a variable T representing the total number of terms in the natural language search query. At 908, control circuitry 506, using natural language processing circuitry 508, determines the total number of occurrences of the $N^{th}$ term in the metadata. Control circuitry 506 then, at 910, calculates a percentage of the total number of words contained in the metadata corresponding to the total number of occurrences of the $N^{th}$ term. For example, if the metadata contains a total of ten thousand words, and the $N^{th}$ term occurs one hundred times, control circuitry 506 will calculate that the $N^{th}$ term represents 0.1% of the words contained in the metadata. Thus, the $N^{th}$ term has a frequency of 0.001.

At 912, control circuitry 506 determines whether N is equal to T, meaning that all the terms of the natural language search query have been processed to determine their respective frequency. If N is not equal to T ("No" at 912), then, at 914, control circuitry 506 increments the value of N by one, and processing returns to step 908. If N is equal to T ("Yes" at 912), then the process is complete.

The actions or descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
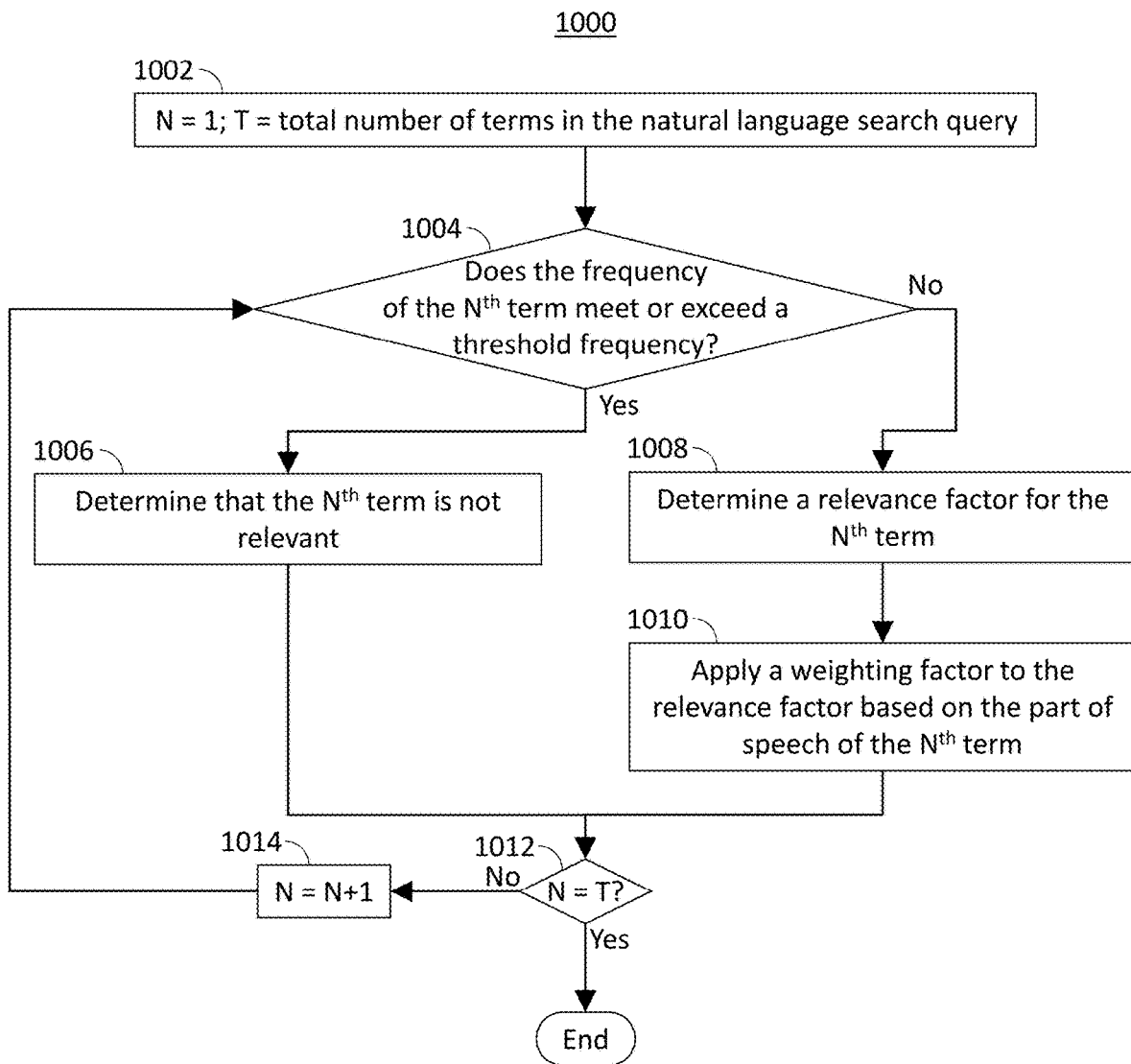
FIG. 10 is a flowchart representing a process for determining a relevance of terms in a natural language search query, in accordance with some embodiments of the disclosure.

FIG. 10 is a flowchart representing an illustrative process 1000 for determining a relevance of terms in a natural language search query, in accordance with some embodiments of the disclosure. Process 1000 may be implemented on control circuitry 506 or control circuitry 606. In addition, one or more actions of FIG. 10 may be incorporated into or combined with one or more actions of any other process or embodiment described herein.

At 1002, control circuitry (e.g., control circuitry 506) initializes a counter variable N, setting its value to one, and a variable T representing the total number of terms in the natural language search query. At 1004, control circuitry 506, determines whether the frequency of the $N^{th}$ term meets or exceeds a threshold frequency. For example, a term having a high frequency, such as a frequency of 0.3, it may be a common term that is not relevant to the search query. However, if the frequency is low, such as 0.05, it may be an uncommon term and therefore may be relevant to the search query because the term would not otherwise normally appear in a search query. If the frequency of the $N^{th}$ term meets or exceeds the threshold frequency ("Yes" at 1004), indicating that the term is relatively common, then, at 1006, control circuitry 506 determines that the $N^{th}$ term is not relevant. However, if the frequency of the $N^{th}$ term does not exceed the threshold frequency ("No" at 1004), indicating that the $N^{th}$ term is relatively uncommon, then, at 1008, control circuitry 506 determines a relevance factor for the $N^{th}$ term. For example, control circuitry 506 may divide the frequency of the $N^{th}$ term by the threshold frequency to determine a relevance factor. For example, if the frequency of the $N^{th}$ term is 0.05 and the threshold frequency is 0.25, then the relevance factor for the $N^{th}$ term is calculated to be 2. At 1010, control circuitry 506 applies a weighting factor to the relevance factor based on the part of speech of the $N^{th}$ term. For example, a stop word or a filter trigger word may be less relevant to the search query than a proper noun or a verb. A weighting factor is used to adjust the overall relevance of the $N^{th}$ term based on its part of speech.

At 1012, control circuitry 506 determines whether N is equal to T, meaning that all terms of the natural language search query have been processed to determine their respective relevance. If N is not equal to T ("No" at 1012), then, at 1014, control circuitry 506 increments the value of N by one, and processing returns to step 1004. If N is equal to T ("Yes" at 1012), then the process is complete.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
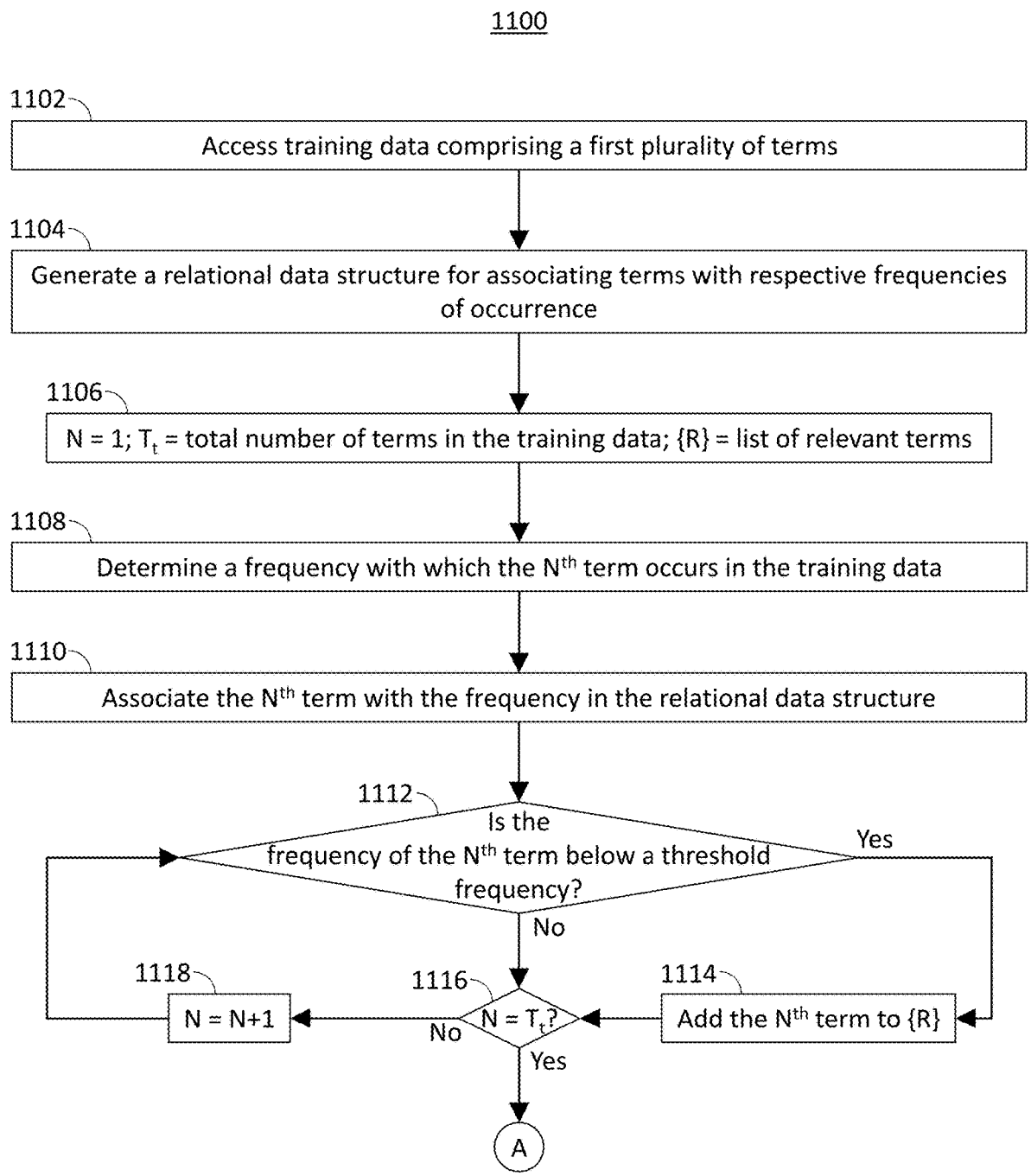
FIG. 11 is a flowchart representing a second process for interpreting a natural language search query, in accordance with some embodiments of the disclosure.
Figure 11:
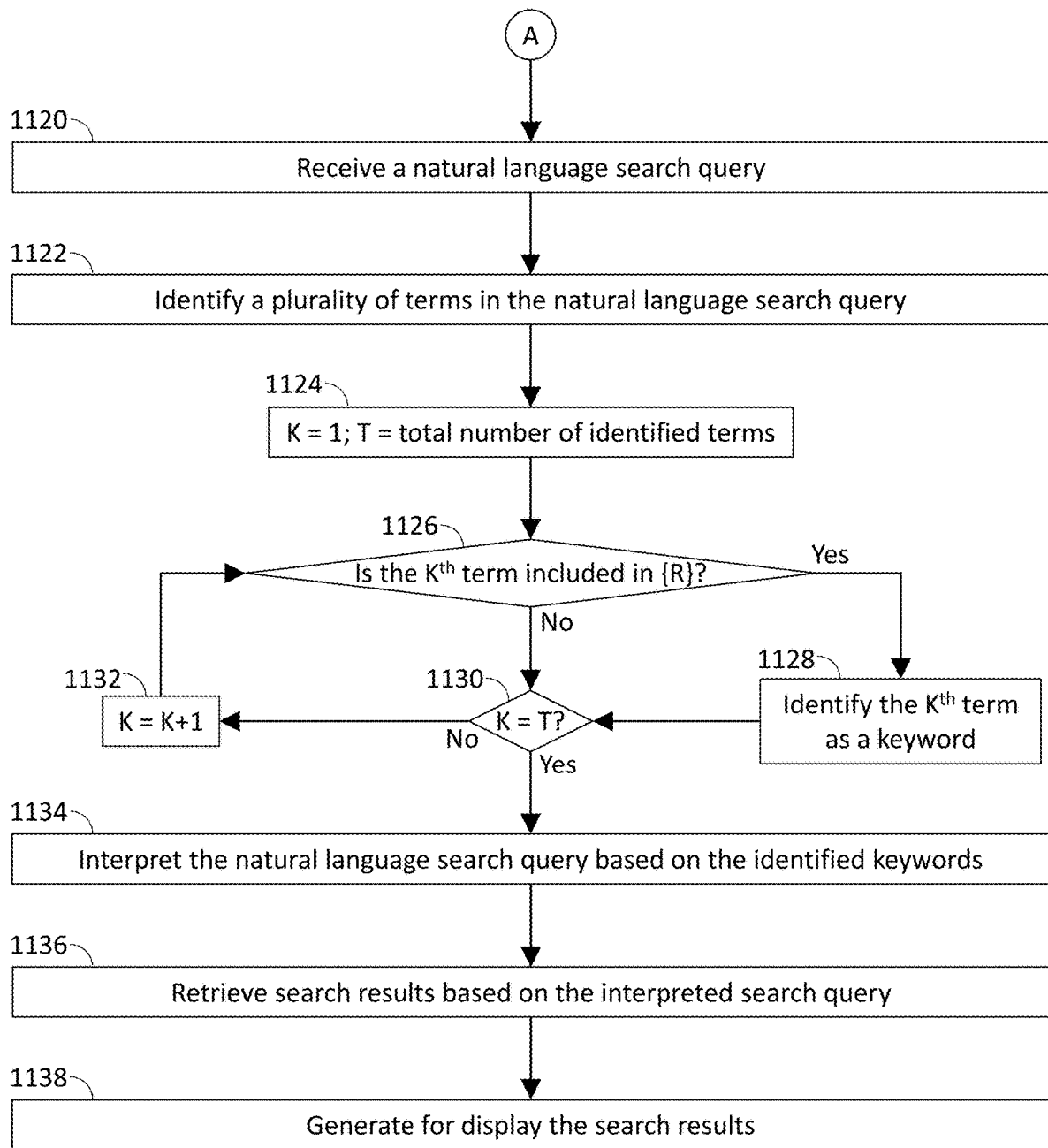

FIG. 11 is a flowchart representing a second illustrative process 1100 for interpreting a natural language search query, in accordance with some embodiments of the disclosure. Process 1100 may be implemented on control circuitry 506 or control circuitry 606. In addition, one or more actions of FIG. 11 may be incorporated into or combined with one or more actions of any other process or embodiment described herein.

At 1102, control circuitry (e.g., control circuitry 506) accesses training data comprising a first plurality of terms. The training data may comprise a set of natural language search queries that have been previously received and manually annotated. At 1104, control circuitry 506 generates a relational data structure for associating terms with respective frequencies of occurrence in the training data. At 1106, control circuitry 506 initializes a counter variable N, setting its value to one, a variable $T_t$ representing the total number of terms in the training data, at a data set {R} to contain a list of relevant terms.

At 1108, control circuitry 506, using natural language processing circuitry 508, determines a frequency with which the $N^{th}$ term occurs in the training data. This may be accomplished using methods described above in connection with FIG. 9. At 1110, control circuitry 506 associates the $N^{th}$ term with the determined frequency in the relational data structure. For example, control circuitry 506 may add an entry to the relational data structure in which the $N^{th}$ term is a token, and the corresponding value is set to the determined frequency of the $N^{th}$ term. At 1112, control circuitry 506 determines whether the frequency of the $N^{th}$ term is below a threshold frequency. If so ("Yes" at 1112), then, at 1114, control circuitry 506 adds the $N^{th}$ term to {R}. After adding the $N^{th}$ term to {R}, or if the frequency of the $N^{th}$ term meets or exceeds the threshold frequency ("No" at 1112), at 1116, control circuitry 506 determines whether N is equal to $T_t$, meaning that all the terms in the training data set have been processed. If N is not equal to T ("No" at 1116), then, at 1118, control circuitry 506 increments the value of N by one, and processing returns to step 1112. If N is equal to $T_t$ ("Yes" at 1116), then, at 1120, control circuitry 506 receives a natural language search query.

At 1122, control circuitry 506, using natural language processing circuitry 508, identifies a plurality of terms in the natural language search query. This may be accomplished using methods described above in connection with FIG. 8. At 1124, control circuitry 506 initializes a counter variable K, setting its value to one, and a variable T representing the total number of identified terms in the natural language search query. At 1126, control circuitry 506 determines whether the $K^{th}$ term is included in {R}, meaning that the $K^{th}$ term is a relevant term. If so ("Yes" at 1126), then, at 1128, control circuitry 506 identifies the $K^{th}$ term as a keyword. After identifying the $K^t$ term as a keyword, or if the $K^t$ term is not included in {R} ("No" at 1126), at 1130, control circuitry 506 determines whether K is equal to T, meaning that all of the identified terms of the natural language search query have been processed. If K is not equal to T ("No" at 1130), then, at 1132, control circuitry 506 increments the value of K by one, and processing returns to step 1126. If K is equal to T ("Yes" at 1130), then at 1134, control circuitry 506, using natural language processing circuitry 508, interprets the natural language search query based on the identified keywords.

At 1136, control circuitry 506 retrieves search results (e.g., from content database 540) based on the interpreted search query. At 1138, control circuitry 506, using output circuitry 544, generates the search results for display to the user.

The actions or descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
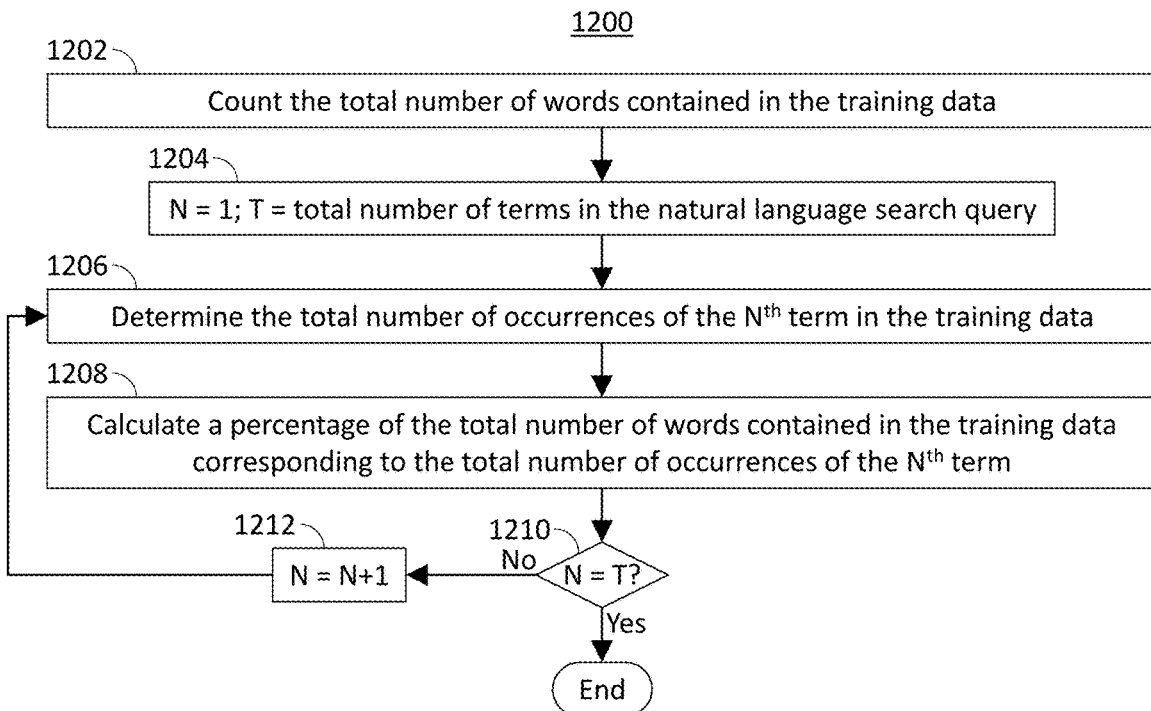
FIG. 12 is a flowchart representing a process for determining a frequency with which terms in a natural language search query occur in a training data set, in accordance with some embodiments of the disclosure.

FIG. 12 is a flowchart representing an illustrative process 1200 determining a frequency with which terms in a natural language search query occur in a training data set, in accordance with some embodiments of the disclosure Process 1200 may be implemented on control circuitry 506 or control circuitry 606. In addition, one or more actions of FIG. 12 may be incorporated into or combined with one or more actions of any other process or embodiment described herein.

At 1202, control circuitry (e.g., control circuitry 506) counts the total number of words contained in the training data set. At 1204, control circuitry 506 initializes a counter variable N, setting its value to one, at a variable T representing the total number of terms in the natural language search query. At 1206, control circuitry 506 determines the total number of occurrences of the $N^{th}$ term in the training data set. This may be accomplished using methods described above in connection with FIG. 9. At 1208, control circuitry 506 calculates a percentage of the total number of words contained in the training data set corresponding to the total number of occurrences of the $N^{th}$ term in the training data set. This may be accomplished using methods described above in connection with FIG. 9. At 1210, control circuitry 506 determines whether N is equal to T, meaning that all the terms of the natural language search query have been processed. If N is not equal to T ("No" at 1210), then, at 1212, control circuitry 506 increments the value of N by one, and processing return to step 1206. If N is equal to T ("Yes" at 1210), then the process is complete.

The actions or descriptions of FIG. 12 may be used with any other embodiment of this disclosure. In addition, the actions and descriptions described in relation to FIG. 12 may be done in suitable alternative orders or in parallel to further the purposes of this disclosure.

Figure 13:
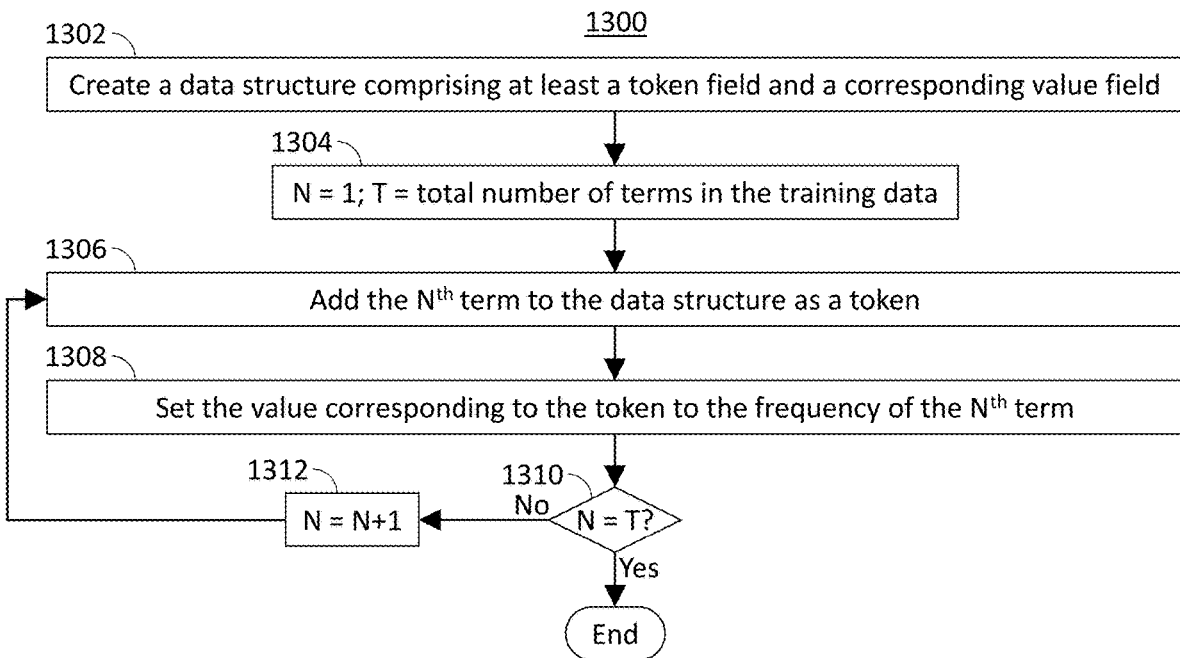
FIG. 13 is a flowchart representing a process for generating a relational data structure associating terms of a natural language search query with respective frequencies of occurrence, in accordance with some embodiments of the disclosure.

FIG. 13 is a flowchart representing an illustrative process 1300 generating a relational data structure associating terms of a natural language search query with respective frequencies of occurrence, in accordance with some embodiments of the disclosure. Process 1300 may be implemented on control circuitry 506 or control circuitry 606. In addition, one or more actions of FIG. 13 may be incorporated into or combined with one or more actions of any other process or embodiment described herein.

At 1302, control circuitry 506 creates a data structure comprising at least a token field and a corresponding value field. At 1304, control circuitry 506 initializes a counter variable N, setting its value to one, and a variable T representing the total number of terms in the training data set. At 1306, control circuitry 506 adds the $N^{th}$ term to the data structure as a token and, at 1318, sets the value corresponding to the token to the frequency of the $N^{th}$ term. At 1310, control circuitry 506 determines whether N it equal to T, meaning that all the terms contained in the training data set have been processed. If N is not equal to T ("No" at 1310), then, at 1312, control circuitry 506 increments the value of N by one, and processing return to step 1306. If N is equal to T ("Yes" at 1310), then the process is complete.

The actions or descriptions of FIG. 13 may be used with any other embodiment of this disclosure. In addition, the actions and descriptions described in relation to FIG. 13 may be done in suitable alternative orders or in parallel to further the purposes of this disclosure.

Figure 14:
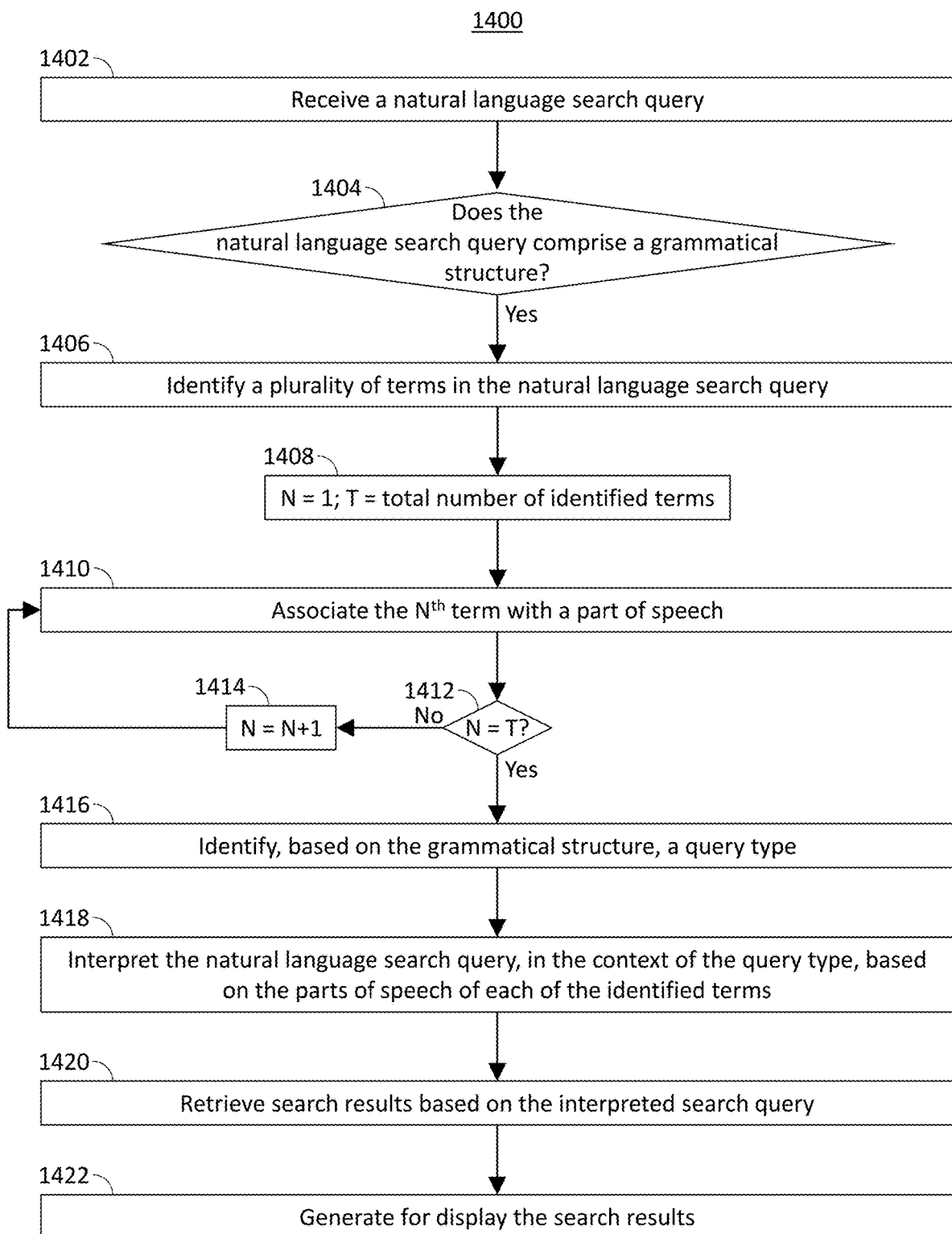
FIG. 14 is a flowchart representing a third process for interpreting a natural language search query, in accordance with some embodiments of the disclosure.

FIG. 14 is a flowchart representing a third illustrative process 1400 interpreting a natural language search query, in accordance with some embodiments of the disclosure. Process 1400 may be implemented on control circuitry 506 or control circuitry 606. In addition, one or more actions of FIG. 14 may be incorporated into or combined with one or more actions of any other process or embodiment described herein.

At 1402, control circuitry (e.g., control circuitry 606) receives a natural language search query. At 1404, control circuitry 606, using natural language processing circuitry 608, determines whether the natural language search query comprises a complete sentence. For example, natural language processing circuitry 608 may use Hidden Markov Model or Conditional Random Field algorithms or a grammar engine to determine the structure of the natural language search query. If the natural language search query does comprise a complete sentence ("Yes" at 1404), then, at 1406, control circuitry 606 identifies a plurality of terms in the natural language search query. This may be accomplished using methods described above in connection with FIG. 8.

At 1408, control circuitry 606 initializes a counter variable N, setting its value to one, and a variable T representing the total number of identified terms. At 1410, control circuitry 606, using natural language processing circuitry 608, associates the $N^{th}$ term with a part of speech. This may be accomplished using methods described above in connection with FIG. 7. At 1412, control circuitry 606 determines whether N is equal to T, meaning that all terms of the natural language search query have been associated with a part of speech. If N is not equal to T ("No" at 1412), then, at 1414, control circuitry 606 increments the value of N by one, and processing returns to step 1410. If N is equal to T ("Yes" at 1412), then, at 1416, control circuitry 606 identifies, based on the sentence structure of the natural language search query, a query type. For example, is the natural language search query begins with "show me," the query type will be a query for content items matching filter parameters contained in the remainder of the sentence. If the query beings with "what is," then the query is an informational request which may return data other than content items. At 1418, control circuitry 606 interprets the natural language search query, in the context of the query type, based on the parts of speech of each of the identified terms. This may be accomplished using methods described above in connection with FIG. 11.

At 1420, control circuitry 606 retrieves search results (e.g., from content database 634) based on the interpreted search query. At 1422, control circuitry 606, using output circuitry 640, generates the search results for display to the user.

The actions or descriptions of FIG. 14 may be used with any other embodiment of this disclosure. In addition, the actions and descriptions described in relation to FIG. 14 may be done in suitable alternative orders or in parallel to further the purposes of this disclosure.

Figure 15:
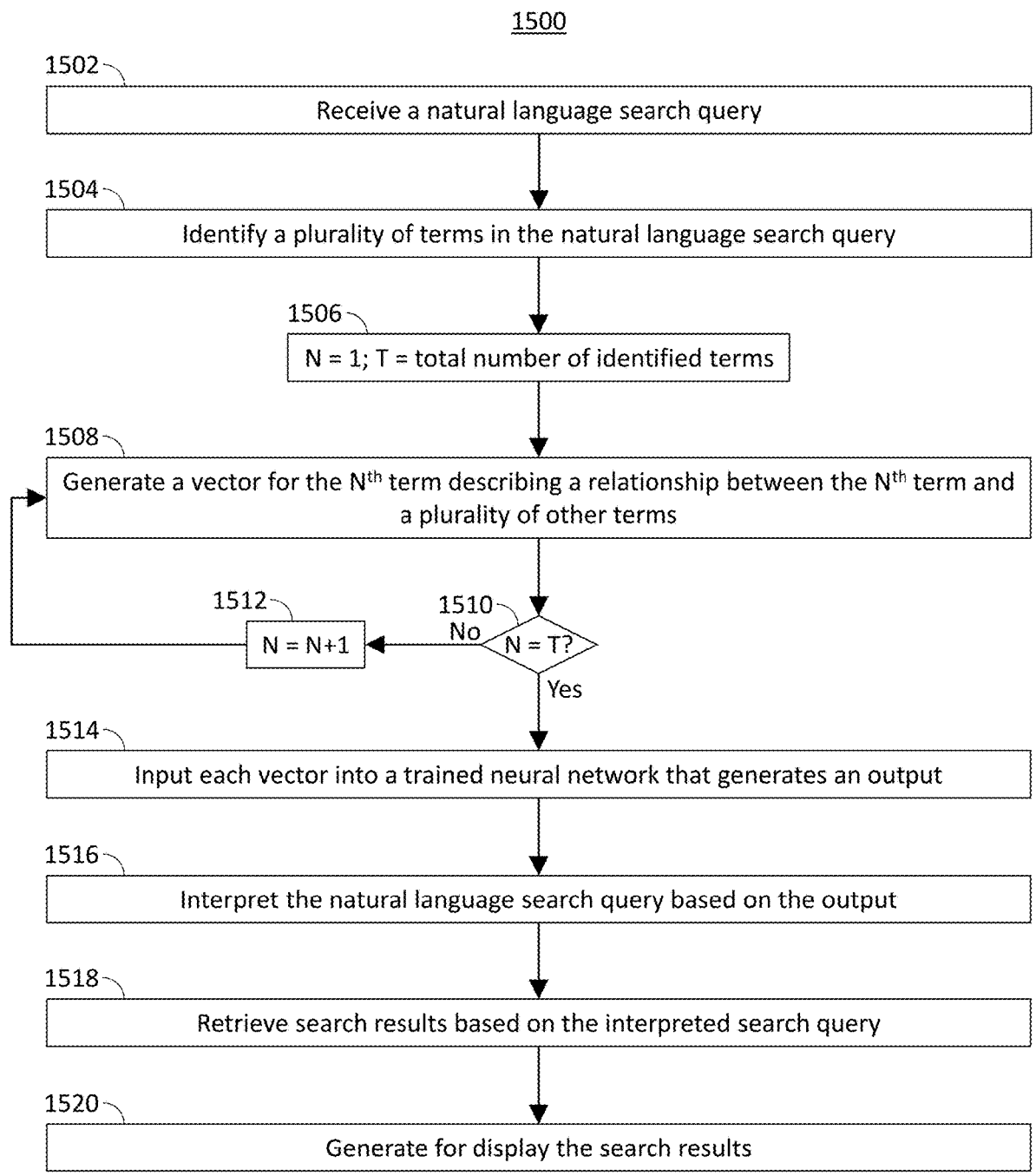
FIG. 15 is a flowchart representing a fourth process for interpreting a natural language search query, in accordance with some embodiments of the disclosure.

FIG. 15 is a flowchart representing a fourth illustrative process 1500 interpreting a natural language search query, in accordance with some embodiments of the disclosure. Process 1500 may be implemented on control circuitry 506 or control circuitry 606. In addition, one or more actions of FIG. 15 may be incorporated into or combined with one or more actions of any other process or embodiment described herein.

At 1502, control circuitry (e.g., control circuitry 606) receives a natural language search query. At 1504, control circuitry 606, using natural language processing circuitry 608, identifies a plurality of terms in the natural language search query. This may be accomplished using methods described above in connection with FIG. 8. At 1506, control circuitry 606 initializes a counter variable N, settings its value to one, and a variable T representing the total number of identified terms. At 1508, control circuitry 606, using vector generation circuitry 618, generates a vector for the $N^{th}$ term describing a relationship between the $N^{th}$ term and a plurality of other terms. This may be accomplished using methods described below in connection with FIG. 16. In some cases, vectors may only be generated for those terms identified as relevant to the search query. At 1510, control circuitry 606 determines whether N is equal to T, meaning that vectors have been generated for all terms of the natural language search query. If N is not equal to T ("No" at 1510), then, at 1512, control circuitry 606 increments the value of N by one, and processing returns to step 1508. If N is equal to T ("Yes" at 1510), then, at 1514, control circuitry 606 inputs each vector into a trained neural network that generates an interpretation of each term for which a vector is input, and for the combination of terms for which vectors have been input. At 1516, control circuitry 606 interprets the natural language search query based on the output of the neural network.

At 1518, control circuitry 606 retrieves search results (e.g., from content database 634) based on the interpreted search query. At 1520, control circuitry 606, using output circuitry 640, generates the search results for display to the user.

The actions or descriptions of FIG. 15 may be used with any other embodiment of this disclosure. In addition, the actions and descriptions described in relation to FIG. 15 may be done in suitable alternative orders or in parallel to further the purposes of this disclosure.

Figure 16:
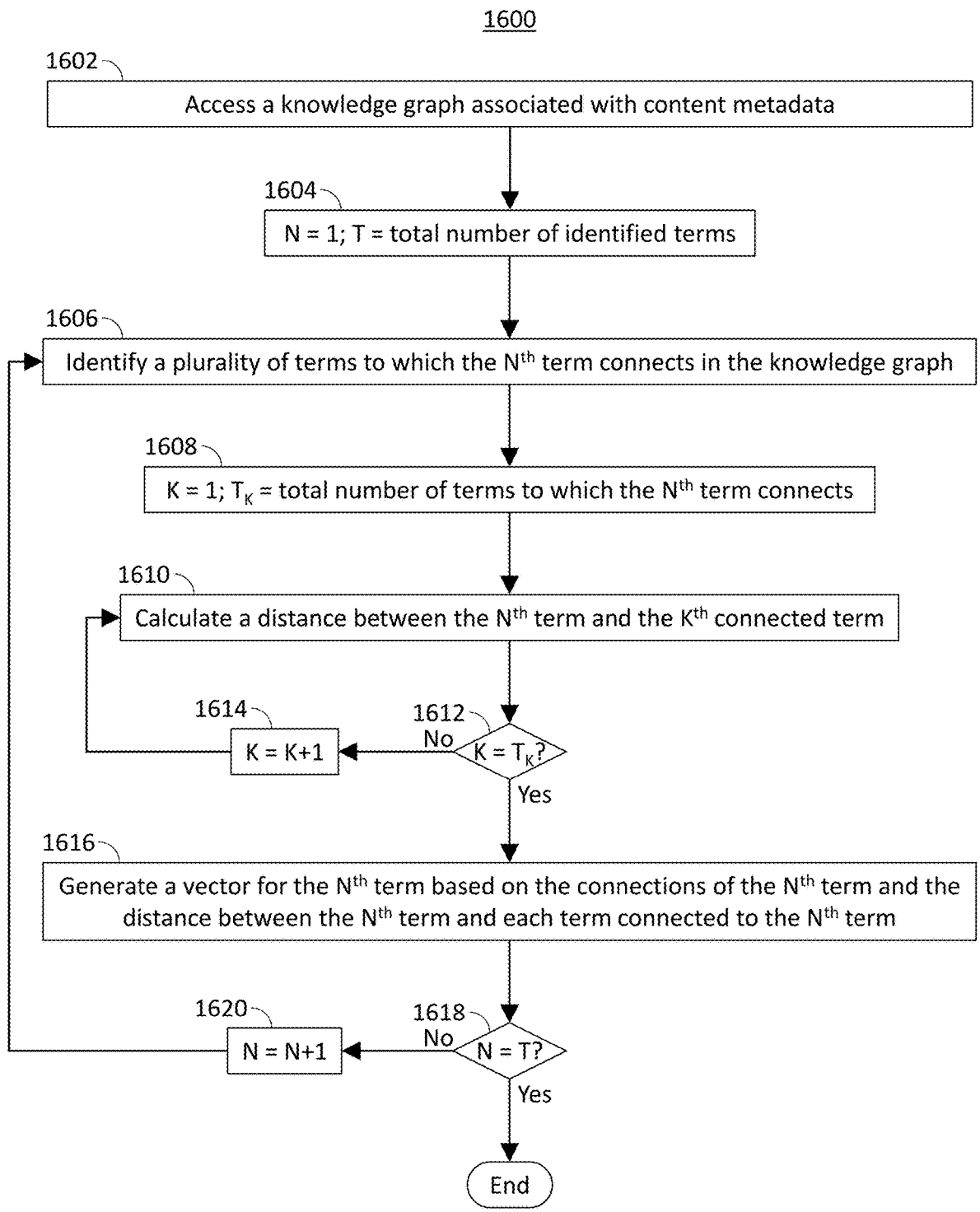
FIG. 16 is a flowchart representing a process for generating vectors for terms in a natural language search query for input into a neural network, in accordance with some embodiments of the disclosure.

FIG. 16 is a flowchart representing an illustrative process 1600 generating vectors for terms in a natural language search query for input into a neural network, in accordance with some embodiments of the disclosure. Process 1600 may be implemented on control circuitry 506 or control circuitry 606. In addition, one or more actions of FIG. 16 may be incorporated into or combined with one or more actions of any other process or embodiment described herein.

At 1602, control circuitry 606, using vector generation circuitry 618, accesses a knowledge graph associated with content metadata. The knowledge graph may contain nodes for every term in the content metadata and include connections between each node representing connections between each term in the content metadata, such as two terms included in the metadata describing a single content item.

At 1604, control circuitry 606 initializes a counter variable N, setting its value to one, and a variable T representing the total number of identified terms in the natural language search query, or the total number of relevant terms in the natural language search query. At 1606, vector generation circuitry 618 identifies a plurality of terms to which the $N^{th}$ term is connected in the knowledge graph. For example, vector control circuitry 618 may count the number of nodes to which the node representing the $N^{th}$ term connects. At 1608, control circuitry 606 initializes another counter variable K, setting its value to one, and another variable $T_K$ representing the total number of terms to which the $N^{th}$ term connects. At 1610, vector generation circuitry 618 calculates a distance between the $N^{th}$ term and the $K^{th}$ connected term. For example, the $K^{th}$ term may connect directly to the node representing the $N^{th}$ term, or may connect indirectly through a number of intermediate nodes. The number of nodes between the $N^{th}$ term and the $K^{th}$ term, or the degree of separation between the two terms, is determined to be the distance between the two terms.

At 1612, control circuitry 606 determines whether K is equal to $T_K$, meaning that a distance between the $N^{th}$ term and every term connected thereto has been calculated. If K is not equal to $T_K$ ("No" at 1612), then, at 1614, control circuitry 606 increments the value of K by one, and processing returns to step 1610. If K is equal to $T_K$ ("Yes" at 1612), then, at 1616, vector generation circuitry 618 generates a vector for the $N^{th}$ term based on the connections of the $N^{th}$ term and the distance between the $N^{th}$ term and each connected term. For example, a vector for the word "January" may include other months of the year with a close distance, and holidays that occur in the month of January with a farther distance. A vector for "Tom Cruise" may include other actors who have co-starred with Tom Cruise with close distances, genres in which Tom Cruise as acted with farther distances, and subgenres with even farther distances.

At 1618, control circuitry 606 determines whether N is equal to T, meaning that a vector for all terms of the natural language search query, or all relevant terms thereof, have been generated. If N is not equal to T ("No" at 1618), then, at 1620, control circuitry 606 increments the value of N by one, and processing return to step 1606. If N is equal to T ("Yes" at 1618), then the process is complete.

The actions or descriptions of FIG. 16 may be used with any other embodiment of this disclosure. In addition, the actions and descriptions described in relation to FIG. 16 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method for interpreting a natural language search query based on a totality of training data comprising a first plurality of terms, the method comprising, using processing circuitry for:
    determining a respective frequency with which each of the first plurality of terms occurs in the totality of the training data;
    generating a relational data structure associating each term of the first plurality of terms with its respective frequency;
    adding a term of the first plurality of terms to a list of relevant terms when its frequency is below a threshold, wherein adding the term of the plurality of terms to the list of relevant terms when its frequency is below the threshold includes:
    determining whether the frequency of the term meets or exceeds a threshold frequency;
    in response to determining that the frequency meets or exceeds the threshold frequency, determining that the respective term is not relevant; and
    in response to determining that the frequency is below the threshold frequency, adding the term to the list of relevant terms;
    receiving the natural language search query;
    identifying a second plurality of terms in the natural language search query;
    determining, for each term of the second plurality of terms, whether the term is included in the list of relevant terms;
    in response to determining that a term of the second plurality of terms is included in the list of relevant terms, identifying the term as a keyword;
    interpreting the natural language search query based on the identified keywords; and
    performing a search for the natural language search query based on the identified keywords.

2. The method of claim 1, wherein determining a respective frequency with which each of the first plurality of terms occurs in the totality of the training data comprises:
    counting the total number of words contained in the totality of the training data;
    determining the total number of occurrences of each respective term of the plurality of terms in the totality of the training data; and
    calculating, for each term of the plurality of terms, a percentage of the total number of words contained in the totality of the training data corresponding to the total number of occurrences of each respective term of the plurality of terms in the totality of the training data.

3. The method of claim 1, wherein generating a relational data structure associating each term of the first plurality of terms with its respective frequency comprises:
    creating a data structure comprising at least a token field and a corresponding value field;

adding to the data structure, for each term of the first plurality of terms, the respective term as a token; and setting the value corresponding to the token to the frequency of the respective term.

4. The method of claim 1, wherein identifying a second plurality of terms in the natural language search query comprises:

splitting the natural language search query into a plurality of words;

analyzing a first word of the plurality of words;

determining, based on analyzing the first word, whether the first word can be part of a phrase;

in response to determining that the first word can be part of a phrase, analyzing the first word together with a second word that immediately follows the first word;

determining, based on analyzing the first word together with the second word, whether the first word and the second word form a phrase together;

in response to determining that the first word and the second word form a phrase together, identifying the first and second word as a single term; and in response to determining that the first word does not form a phrase with the second word, identifying the first word as single term.

5. A system for interpreting a natural language search query based on a totality of training data comprising a first plurality of terms, the system comprising control circuitry configured to:

determine a respective frequency with which each of the first plurality of terms occurs in the totality of the training data;

generate a relational data structure associating each term of the first plurality of terms with its respective frequency;

add a term of the first plurality of terms to a list of relevant terms when its frequency is below a threshold, wherein the control circuitry configured to add the term of the plurality of terms to the list of relevant terms when its frequency is below the threshold is further configured to:

determine whether the frequency of the term meets or exceeds a threshold frequency;

in response to determining that the frequency meets or exceeds the threshold frequency, determine that the respective term is not relevant; and in response to determining that the frequency is below the threshold frequency, add the term to the list of relevant terms;

receive the natural language search query;

identify a second plurality of terms in the natural language search query;

determine, for each term of the second plurality of terms, whether the term is included in the list of relevant terms;

in response to determining that a term of the second plurality of terms is included in the list of relevant terms, identify the term as a keyword;

interpret the natural language search query based on the identified keywords; and perform a search for the natural language search query based on the identified keywords.

6. The system of claim 5, wherein the control circuitry configured to determine a respective frequency with which each of the first plurality of terms occurs in the totality of the training data is further configured to:

count the total number of words contained in the training data;

determine the total number of occurrences of each respective term of the plurality of terms in the totality of the training data; and calculate, for each term of the plurality of terms, a percentage of the total number of words contained in the totality of the training data corresponding to the total number of occurrences of each respective term of the plurality of terms in the training data.

7. The system of claim 5, wherein the control circuitry configured to generate a relational data structure associating each term of the first plurality of terms with its respective frequency is further configured to:

create a data structure comprising at least a token field and a corresponding value field;

add to the data structure, for each term of the first plurality of terms, the respective term as a token; and set the value corresponding to the token to the frequency of the respective term.

8. The system of claim 5, wherein the control circuitry configured to identify a second plurality of terms in the natural language search query is further configured to:

split the natural language search query into a plurality of words;

analyze a first word of the plurality of words;

determine, based on analyzing the first word, whether the first word can be part of a phrase;

in response to determining that the first word can be part of a phrase, analyze the first word together with a second word that immediately follows the first word;

determine, based on analyzing the first word together with the second word, whether the first word and the second word form a phrase together;

in response to determining that the first word and the second word form a phrase together, identify the first and second word as a single term; and in response to determining that the first word does not form a phrase with the second word, identify the first word as single term.

9. A non-transitory computer-readable medium having non-transitory computer-readable instructions encoded thereon for interpreting a natural language search query based on a totality of training data comprising a first plurality of terms that, when executed by control circuitry, cause the control circuitry to:

determine a respective frequency with which each of the first plurality of terms occurs in the totality of the training data;

generate a relational data structure associating each term of the first plurality of terms with its respective frequency;

add a term of the first plurality of terms to a list of relevant terms when its frequency is below a threshold, wherein execution of the instruction to add the term of the plurality of terms to the list of relevant terms when its frequency is below the threshold further causes the control circuitry to:

determine whether the frequency of the term meets or exceeds a threshold frequency;

in response to determining that the frequency meets or exceeds the threshold frequency, determine that the respective term is not relevant; and in response to determining that the frequency is below the threshold frequency, add the term to the list of relevant terms;

receive the natural language search query;

identify a second plurality of terms in the natural language search query;

determine, for each term of the second plurality of terms, whether the term is included in the list of relevant terms;

in response to determining that a term of the second plurality of terms is included in the list of relevant terms, identify the term as a keyword;

interpret the natural language search query based on the identified keywords; and perform a search for the natural language search query based on the identified keywords.

10. The non-transitory computer-readable medium of claim 9, wherein execution of the instruction to determine a respective frequency with which each of the first plurality of terms occurs in the totality of the training data further causes the control circuitry to:

count the total number of words contained in the totality of the training data;

determine the total number of occurrences of each respective term of the plurality of terms in the totality of the training data; and calculate, for each term of the plurality of terms, a percentage of the total number of words contained in the totality of the training data corresponding to the total number of occurrences of each respective term of the plurality of terms in the training data.

11. The non-transitory computer-readable medium of claim 9, wherein execution of the instruction to generate a relational data structure associating each term of the first plurality of terms with its respective frequency further causes the control circuitry to:

create a data structure comprising at least a token field and a corresponding value field;

add to the data structure, for each term of the first plurality of terms, the respective term as a token; and set the value corresponding to the token to the frequency of the respective term.

12. The non-transitory computer-readable medium of claim 9, wherein execution of the instruction to identify a second plurality of terms in the natural language search query further causes the control circuitry to:

split the natural language search query into a plurality of words;

analyze a first word of the plurality of words;

determine, based on analyzing the first word, whether the first word can be part of a phrase;

in response to determining that the first word can be part of a phrase, analyze the first word together with a second word that immediately follows the first word;

determine, based on analyzing the first word together with the second word, whether the first word and the second word form a phrase together;

in response to determining that the first word and the second word form a phrase together, identify the first and second word as a single term; and in response to determining that the first word does not form a phrase with the second word, identify the first word as single term.

* * * * *